United States Patent
Yeh et al.

(10) Patent No.: US 10,579,179 B2
(45) Date of Patent: Mar. 3, 2020

(54) DISPLAY PANEL AND METHOD FOR MANUFACTURING THE SAME

(71) Applicant: HannStar Display Corporation, Taipei (TW)

(72) Inventors: Cheng-Yen Yeh, Taichung (TW); Kuo-Chang Su, Tainan (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 16/163,558

(22) Filed: Oct. 17, 2018

(65) Prior Publication Data

US 2019/0129549 A1    May 2, 2019

(30) Foreign Application Priority Data

Oct. 30, 2017 (CN) .......................... 2017 1 1031712

(51) Int. Cl.

| | | |
|---|---|---|
| *G06F 3/041* | (2006.01) | |
| *G02F 1/1368* | (2006.01) | |
| *G02F 1/1333* | (2006.01) | |
| *G02F 1/1343* | (2006.01) | |
| *G06F 3/044* | (2006.01) | |
| *G02F 1/1362* | (2006.01) | |
| *G09G 3/36* | (2006.01) | |

(52) U.S. Cl.
CPC .......... *G06F 3/0412* (2013.01); *G02F 1/1368* (2013.01); *G02F 1/13338* (2013.01); *G02F 1/134309* (2013.01); *G02F 1/136227* (2013.01); *G06F 3/044* (2013.01); *G02F 2001/134372* (2013.01); *G02F 2201/121* (2013.01); *G02F 2201/123* (2013.01); *G06F 2203/04103* (2013.01); *G09G 3/3677* (2013.01)

(58) Field of Classification Search
CPC ................... G06F 3/0412; G06F 3/044; G06F 2203/04103; G02F 1/13338; G02F 1/134309; G02F 1/136227; G02F 1/1368; G02F 2001/134372; G02F 2201/121; G02F 2201/123; G09G 3/3677
USPC ....................................................... 345/174
See application file for complete search history.

(56) References Cited

U.S. PATENT DOCUMENTS

| | | | | |
|---|---|---|---|---|
| 8,217,913 B2 * | 7/2012 | Hotelling | .............. | G06F 3/0412 345/173 |
| 8,743,301 B2 * | 6/2014 | Shin | ...................... | G06F 3/0412 345/173 |

(Continued)

*Primary Examiner* — Jennifer Mehmood
*Assistant Examiner* — Ngan T Pham Lu
(74) *Attorney, Agent, or Firm* — CKC & Partners Co., LLC

(57) ABSTRACT

In a display panel, a first conducting layer is disposed on a substrate and has a touch sensing line. A first insulation layer is disposed on a first conducting layer with a first opening exposing the touch sensing line as a first connection part. A second insulation layer is disposed on the first insulation layer with a second opening. A first electrode is disposed on the second insulation layer with a third opening that is overlapped with the second opening. A third insulation layer is disposed on the first electrode with a fourth opening exposing the first electrode as a second connection part. The fourth opening overlaps with the third opening. A second electrode is disposed on the third insulation layer and is connected to the first connection part and the second connection part through the first to fourth openings.

19 Claims, 28 Drawing Sheets

(56) References Cited

U.S. PATENT DOCUMENTS

| | | | |
|---|---|---|---|
| 2015/0236047 A1* | 8/2015 | Kim | H01L 27/124 |
| | | | 345/174 |
| 2016/0054609 A1* | 2/2016 | Kim | G06F 3/0412 |
| | | | 438/24 |
| 2017/0060313 A1* | 3/2017 | Kim | G06F 3/044 |
| 2017/0300156 A1* | 10/2017 | Oh | G02F 1/13338 |
| 2018/0188581 A1* | 7/2018 | Peng | G02F 1/133345 |

* cited by examiner

DISPLAY PANEL AND METHOD FOR MANUFACTURING THE SAME

RELATED APPLICATIONS

This application claims priority to China Application Serial Number 201711031712.X filed Oct. 30, 2017, which is herein incorporated by reference.

BACKGROUND

Field of Invention

The present invention relates to a display panel. More particularly, the present invention relates to an in-cell touch display panel and a method for manufacturing the in-cell touch display panel.

Description of Related Art

In an in-cell touch display device, a touch electrode which provides a touch function is disposed in a pixel structure. The touch electrode is connected to a circuit through a conductive line. The circuit may detect a capacitance variance of the touch electrode to determine whether a corresponding position of the touch display device is touched. In general, in a touch sensing period, the touch electrode is used for sensing touch; and in a display period, a common voltage is applied to the touch electrode which would serve as a common electrode. However, it is an issue in the art about how to reduce the cost of manufacturing the display panel while the functions of the touch electrode are still maintained.

SUMMARY

An objective of the invention is to provide a display panel and a method for manufacturing the display panel in which less processes are required to produce an in-cell display panel.

Embodiments of the invention provide a display panel having a display area and a non-display area. The display device includes a substrate and a pixel structure in the display area. The pixel structure includes the following units. A first conducting layer is disposed on the substrate and has a scan line and a touch sensing line. A first insulation layer is disposed on the first conducting layer, in which the first insulation layer has a first opening exposing at least a portion of the touch sensing line as a first connection part. A second conducting layer is disposed on the first insulation layer, in which the second conducting layer includes a data line. A second insulation layer is disposed on the second conducting layer and the first insulation layer, in which the second insulation layer has a second opening corresponding to the first opening. A first electrode is disposed on the second insulation layer, in which the first electrode has a third opening which is at least partially overlapped with the second opening. A third insulation layer is disposed on the first transparent electrode, in which the third insulation layer has a fourth opening exposing at least a portion of the first electrode as a second connection part, and the fourth opening is at least partially overlapped with the third opening. A second electrode is disposed on the third insulation layer, in which the second electrode is connected to the first connection part and the second connection part through the fourth opening, the third opening, the second opening, and the first opening.

In some embodiments, a ratio of an area of the second connection part exposed by the fourth opening to an area of the fourth opening is in a range from 0.1 to 1.

In some embodiments, an area of the second electrode contacting with the first connection part is defined as a first contacting area, and an area of the second electrode contacting the second connection part is defined as a second contacting area, and a ratio of the first contacting area to the second contacting area is in a range from 0.1 to 10.

In some embodiments, display panel further includes the following units. A gate is formed by the first conducting layer. A source and a drain are formed by the second conducting layer. A semiconductor layer is insulated from the gate. A pixel electrode is disposed on the third insulation layer, in which the pixel electrode has a slit pattern, and the pixel electrode and the second electrode are formed by a same process. The second insulation layer further has a fifth opening exposing a portion of the drain, and the first electrode has a sixth opening overlapped with the fifth opening, and the third insulation layer has a seventh opening overlapped with the fifth opening. The pixel electrode is connected to the drain through the fifth opening, the sixth opening, and the seventh opening.

In some embodiments, the touch sensing line is at least partially overlapped with the drain and the pixel electrode.

In some embodiments, the touch sensing line includes an extending pad which is overlapped with the fourth opening along a direction perpendicular to the substrate.

In some embodiments, the extending pad extends along a direction from the touch sensing line to the scan line.

In some embodiments, an area of the second electrode is larger than an area of the fourth opening. The second electrode includes: a first portion connecting to the first electrode through the fourth opening; a second portion overlapped with the fourth opening and the third opening, in which the second portion is connected to the touch sensing line but not connected to the first portion; and a third portion not overlapped with the fourth opening, in which the third portion is formed on the third insulation layer and connected to the first portion and the second portion.

In some embodiments, the scan line and the touch sensing line extend along a first direction, and the data line extends along a second direction, and the first direction is substantially perpendicular to the second direction.

In some embodiments, the display panel further includes multiple gate pads, an integrated gate driver, multiple touch sensing pads, and multiple source pads. The integrated gate driver is disposed at a side of the display area for electrically connecting to the scan line and electrically connecting to the gate pads. The touch sensing pads are arranged along the second direction and disposed at another side of the display area for electrically connecting to the sensing line. The source pads are arranged along the second direction in the non-display area. The touch sensing pads are disposed between the source pads.

In some embodiments, the display panel further includes gate pads, touch sensing pads, and source pads. The gate pads are arranged along the first direction in the non-display area. The touch sensing pads are arranged along the first direction in the non-display area. The source pads are arranged along the first direction in the non-display area. The source pads are disposed between the touch sensing pads and between the gate pads.

From another aspect, embodiments of the invention provide a method for manufacturing a display panel. The method includes: providing a substrate; forming a patterned first conducting layer on the substrate, in which the patterned first conducting layer includes a scan line, a touch sensing line and a gate; forming a first insulation layer on the patterned the first conducting layer; forming a patterned semiconductor layer on the first insulation layer; forming a patterned second conducting layer on the first insulation layer, in which the patterned second conducting layer includes a drain, a source and a data line, and the data line is connected to the source; forming a second insulation layer on the patterned second conducting layer and the first insulation layer; forming a patterned first electrode on the second insulation layer, in which the patterned first electrode includes a third opening which is partially overlapped with the touch sensing line; forming a third insulation layer on the patterned first transparent electrode; performing an etching process to form a fourth opening in the third insulation layer, a second opening in the second insulation layer, and a first opening in the first insulation layer, in which the first opening exposes a portion of the touch sensing line as a first connection part, and the fourth opening is at least partially overlapped with the third opening, and the fourth opening exposes a portion of the first electrode as a second connection part; and forming a patterned second electrode on the third insulation layer, in which the patterned second electrode includes a connection electrode for electrically connecting the first connection part with the second connection part.

In some embodiments, a ratio of an area of the second connection part exposed by the fourth opening to an area of the fourth opening is in a range from 0.1 to 1.

In some embodiments, an area of the second electrode contacting the first connection part is defined as a first contacting area, and an area of the second electrode contacting the second connection part is defined as a second contacting area, and a ratio of the first contacting area to the second contacting area is in a range from 0.1 to 10.

In some embodiments, the touch sensing line is at least partially overlapped with the drain and the pixel electrode.

In some embodiments, the touch sensing line includes an extending pad which is overlapped with the fourth opening along a direction perpendicular to the substrate.

In some embodiments, the extending pad extends along a direction from the touch sensing line to the scan line.

In some embodiments, an area of the second electrode is larger than an area of the fourth opening. The second electrode includes: a first portion connecting to the first electrode through the fourth opening; a second portion overlapped with the fourth opening and the third opening, in which the second portion is connected to the touch sensing line but not connected to the first portion; and a third portion not overlapped with the fourth opening, in which the third portion is formed on the third insulation layer and connected to the first portion and the second portion.

From another aspect, embodiments of the invention provide a method for manufacturing a display panel. The method includes: providing a substrate; performing a first patterning process to form a patterned first conducting layer on the substrate, in which the patterned first conducting layer includes a scan line, a touch sensing line and a gate; forming a first insulation layer on the patterned the first conducting layer; performing a second patterning process, to form a patterned semiconductor layer on the first insulation layer; performing a third patterning process, to form a first opening in the first insulation layer, in which the first opening exposes a portion of the touch sensing line as a first connection part; performing a fourth patterning process to form a patterned second conducting layer on the first insulation layer, in which the patterned second conducting layer includes a drain, a source and a data line, and the data line is connected to the source, in which the patterned second conducting layer is connected to the patterned first conducting layer through the first opening in the non-display area; forming a second insulation layer on the first insulation layer and on the patterned second conducting layer; performing a fifth patterning process to form a patterned first electrode on the second insulation layer, in which the patterned first electrode includes a third opening which is partially overlapped with the touch sensing line; forming a third insulation layer on the patterned first transparent electrode; performing a sixth patterning process to form a fourth opening in the third insulation layer, and a second opening in the second insulation layer, in which the fourth opening is at least partially overlapped with the third opening, and the fourth opening exposes a portion of the first electrode as a second connection part; and performing a seventh patterning process to form a patterned second electrode on the third insulation layer, in which the patterned second electrode includes a connection electrode for electrically connecting the first connection part with the second connection part.

Compared with the prior art, the display panel and the manufacturing method have an advantage that less processes are required to produce an in-cell touch display panel.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to particular order or sequence.

Figure 1:
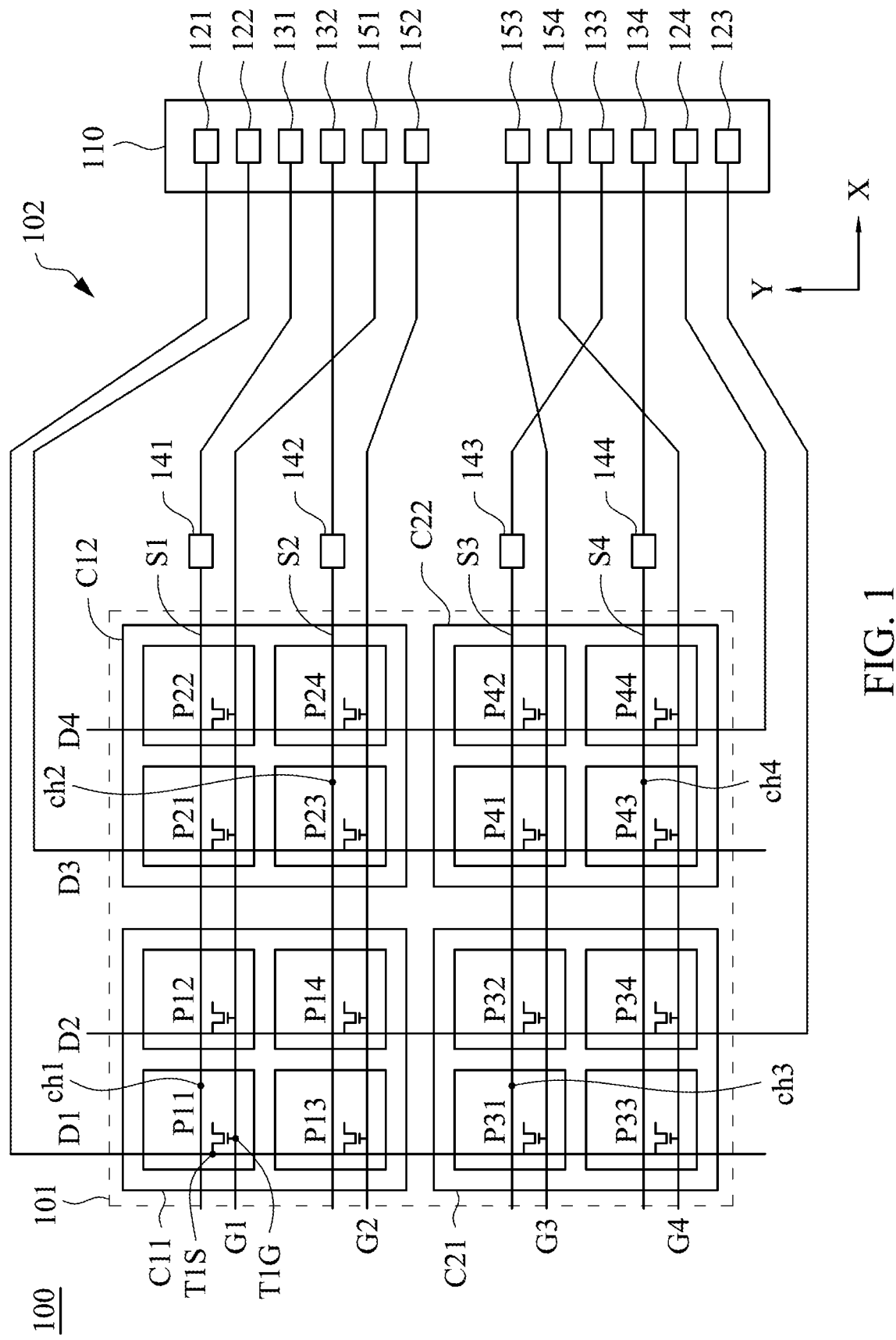
FIG. 1 is a schematic diagram illustrating the connection of a data line and a touch sensing line in an in-cell touch display panel in accordance with an embodiment.

FIG. 1 is a schematic diagram illustrating the connection of a data line and a touch sensing line in an in-cell touch display panel in accordance with an embodiment. Referring to FIG. 1, an in-cell touch display panel 100 includes a display area 101 and a non-display area 102. The non-display area 102 is located at at least one side of the display area 101. The display area 101 is first described. The display area 101 includes multiple pixel structures P11-P14, P21-P24, P31-P34, and P41-P44; scan lines G1-G4 extending along a X direction (also referred to as a first direction); data lines D1-D4 extending along a Y direction (also referred to as a second direction); and touch sensing lines S1-S4 extending along the X direction. An angle, which is formed between the second direction and the touch sensing lines S1-S4, is in a range from 75 degrees to 105 degrees, in which an embodiment of 90-degree angle is shown in FIG. 1. Each pixel structure includes a thin film transistor (TFT). Each of the data lines D1-D4 is electrically connected to a source of the corresponding thin film transistor, and each of the scan lines G1-G4 is electrically connected to a gate of the corresponding thin film transistor. For example, the pixel structure P11 includes a thin film transistor T1 which has a gate T1G and a source T1S. The scan line G1 is electrically connected to the gate T1G, and the data line D1 is electrically connected to the source T1S.

The in-cell touch display panel 100 further includes touch electrodes C11, C12, C21, and C22. Each touch electrode corresponds to multiple pixel structures of all pixel structures in the display area. Each touch electrode is electrically connected to one touch sensing line through a contact hole ch. For example, the touch electrode C11 corresponds to the pixel structures P11-P14 and is electrically connected to the touch sensing line S1, and that is to say, each of the pixel structures P11-P14 has a portion of the touch electrode C11. From another aspect, the touch electrode C11 is shared by the pixel structures P11-P14 as a common electrode that receives a common voltage in a display period. The touch electrode C12 corresponds to the pixel structures P21-P24 and is electrically connected to the touch sensing line S3, and that is to say, each of the pixel structures P21-P24 includes a portion of the touch electrode C12. The touch electrode C21 corresponds to the pixel structures P31-P34 and is electrically connected to the touch sensing line S2, and that is to say, each of the pixel structures P31-P34 includes a portion of the touch electrode C21. The touch electrode C22 corresponds to the pixel structures P44-P44 and is electrically connected to the touch sensing line S4, and that is to say, each of the pixel structures P41-P44 includes a portion of the touch electrode C22. The number of the pixel structures to which one touch electrode corresponds is not limited in the invention, and this number can be decided based on a design requirement. For example, the in-cell touch display panel with resolution of 720 (data lines)×3 (RGB)×1,280 (scan lines) may be practically designed to include 18 (X direction)×32 (Y direction)=576 touch electrodes. These touch electrodes corresponds 720×3=2,160 data lines and 1,280 scan lines, and thus there are 2160×1280=2,764,800 pixel structures. In other words, one touch electrode corresponds to 40×3×40=4,800 pixel structures (i.e. sub-pixels). To be specific, each touch electrode corresponds to 40×3=120 columns of pixel structures along the X direction, and corresponds to 40 rows of pixel structures along the Y direction. This example is merely used for describing the corresponding relationship between the touch electrodes and the pixel structures, and the number of the pixel structures to which one touch electrode corresponds may be modified based on a design requirement. In addition, the areas of the touch electrodes C11, C12, C21, and C22 may be the same or different from each other (e.g. the touch electrode C11 is smaller or larger than the touch electrode C12; C21, C22 or the touch electrode C11 is larger than the touch electrode C12 but smaller than C21, etc.), and the areas can be decided based on a design requirement. In this case, the number of pixel structures to which C11 corresponds is not equal to the number of the pixel structures to which C12 or C21 corresponds.

Multiple source pads 121-124, touch sensing pads 131-134, and gate pads 151-154 are disposed in the non-display area 102. The source pads 121-124 are electrically connected to the data lines D1-D4 respectively. The touch sensing pads 131-134 are electrically connected to the touch sensing lines S1-S4 respectively. The gate pads 151-154 are electrically connected to the scan lines G1-G4 respectively. In this embodiment, the scan lines G1-G4 and the touch sensing lines S1-S4 are formed in the same metal layer, and therefore multiple connection structures 141-144 are disposed in the non-display area 102 for transferring the touch sensing lines S1-S4 to another metal layer (e.g. the same metal layer as the data lines). Accordingly, the scan lines G1-G4 may intersect with the touch sensing lines S1-S4 in the non-display area 102. In other embodiments, the connection structures 141-144 may be disposed on the scan lines G1-G4, which is not limited in the invention. The source pads 121-124, the touch sensing pads 131-134, and the gate pads 151-154 are all electrically connected to a driving circuit 110 which may be disposed on a flexible circuit board such as Tape Carrier Package (TCP) or Chip on Film (COF). Alternatively, the driving circuit 110 may be disposed on the TFT substrate.

A frame period is divided into one or more display periods and one or more touch periods. In the display period, the touch electrodes C11, C12, C21, and C22 are coupled to a common voltage to serve as common electrodes. From another aspect, each pixel structure includes one common electrode and one pixel electrode which is electrically connected to the drain of the corresponding thin film transistor. The voltage difference between the common electrode and the pixel electrode is used to decide display brightness. In the embodiment of FIG. 1, the common electrodes of four adjacent pixel structures are connected to each other and belong to the same touch electrode. For example, all the common electrodes in the pixel structures P11-P14 belong to the touch electrode C11, and therefore all voltages of the common electrodes in the pixel structures P11-P14 are the same (equal to the common voltage) in the display period. Voltages of the scan lines G1-G4 are configured to sequentially turn on the corresponding thin film transistors, and the driving circuit 110 transmits pixel data to the corresponding pixel electrodes through the data lines D1-D4. On the other hand, in the touch period, the touch electrodes C11, C12, C21, C22 are used to detect a touch event caused by an object such as multiple fingers on the in-cell touch display panel 100, and the driving circuit 110 would detect voltage variances (caused by capacitance variances) of the touch electrodes C11, C12, C21, C22 through the touch sensing lines S1-S4, so as to generate a touch sensing signal. In other words, a spatial resolution of the touch operation depends on the number of the touch electrodes, and a spatial resolution of display depends on the number of the pixel structures. To be more specific, the in-cell touch display panel with capacitive touch technology is adopted in the invention.

FIG. 1 is merely illustrated as an example, and the invention is not limited to the structure shown in FIG. 1. For example, one touch electrode corresponds to four pixel structures in FIG. 1, but each touch electrode may correspond to more or less pixel structures in other embodiments. In addition, each pixel structure (i.e. sub-pixel) generally renders a single color, and three sub-pixels constitute one pixel. The three sub-pixels are generally arranged along the X direction, and thus the resolution of the pixel structures along the X direction is larger than that along the Y direction. The number of the pixels in the display area 101 is not limited in the invention.

Figure 2A:
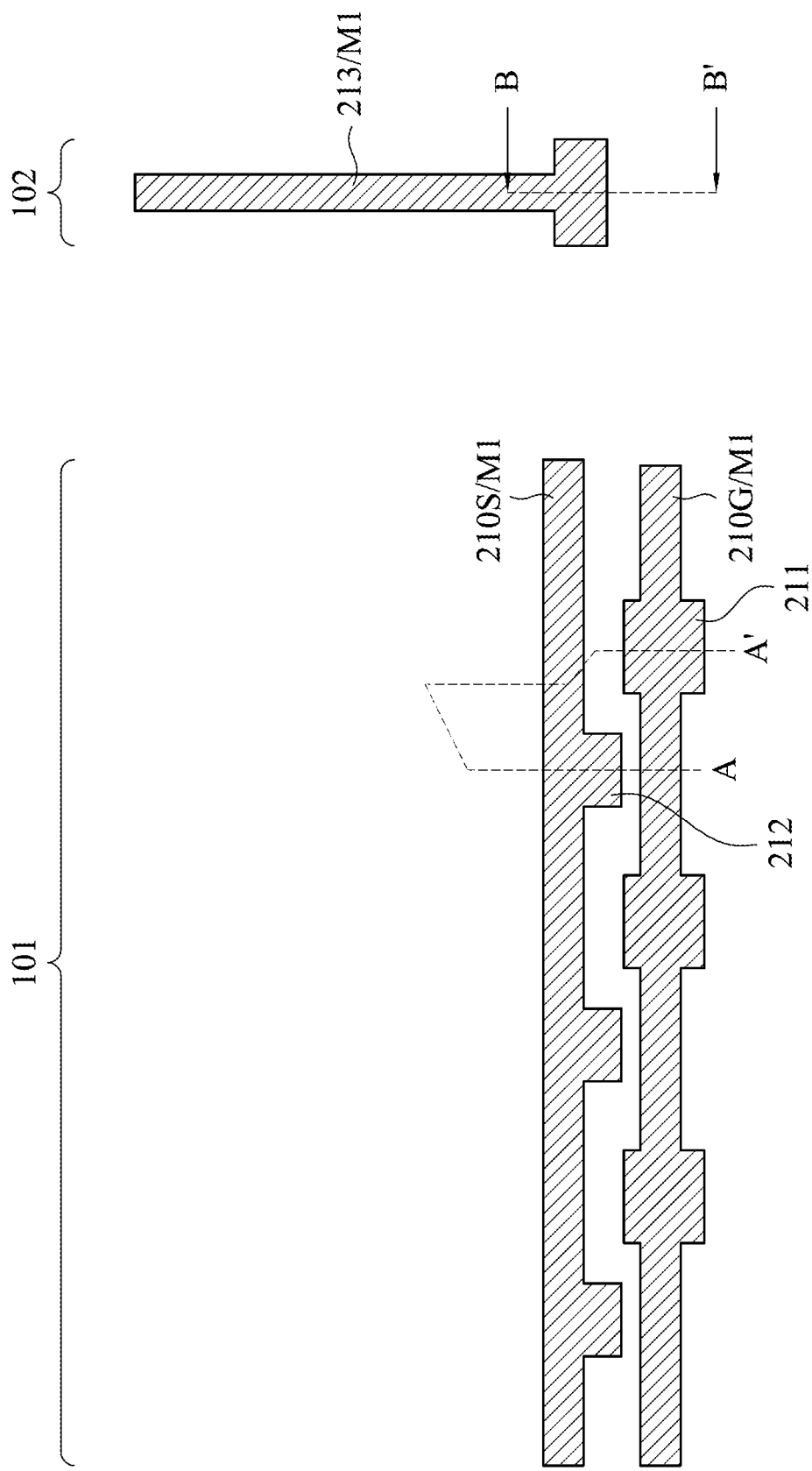
FIG. 2A, FIG. 3A, FIG. 4A, FIG. 5A, FIG. 6A, and FIG. 7A are top views of intermedia steps for manufacturing a pixel structure in accordance with an embodiment.

FIG. 2A to FIG. 7A are top views of intermedia steps for manufacturing a pixel structure in accordance with an embodiment. FIG. 2B to FIG. 7B are cross-sectional views of intermedia steps for manufacturing the pixel structure in accordance with an embodiment. Referring to FIG. 2A and FIG. 2B, the pixel structures are shown in the display area 101, and the connection structure (e.g. the connection structure 141 in FIG. 1) is shown in the non-display area 102. FIG. 2B is a cross-sectional view of the display panel along cross-sectional lines AA' and BB' of FIG. 2A. The Z axis is perpendicular to the top surface of a substrate SUB, and FIG. 2A is the diagram of the substrate SUB when viewed from the Z axis. The method for manufacturing the display panel includes the following steps. First, the substrate SUB is provided. The substrate SUB may be a glass substrate, a plastic substrate such as Polymethylmethacrylate (PMMA), Polycarbonate (PC), Cyclo Olefin (Co)-polymers (COP), Polyethylene terephthalate (PET) or a film substrate such as Polyimide with a thickness of 3-35 (μm). Next, a first patterning process is performed to form a patterned first conducting layer (may be metal or non-metal) such as a metal layer M1 (also referred to a first metal layer) on the substrate SUB. The patterning process includes, for example, a photolithography process. The metal layer M1 may be a single layer of metal or a stack of multiple metal layers that includes metal or alloys such as aluminum, molybdenum, copper, niobium, neodymium, titanium, or the combination thereof. In the display area 101, the metal layer M1 includes a scan line 210G, a touch sensing line 210S, and a gate 211. In some embodiments, the touch sensing line 210S includes an extending pad 212 which extends toward the scan line 210G, but in other embodiments, the extending pad 212 may extend toward a direction opposite to the scan line 210G, or the touch sensing line 210S does not have the extending pad 212. In this embodiments, the width of the touch sensing line 210S is equal to the width of the scan line 210G, but the width of the touch sensing line 210S may be greater than that of the scan line 210G in other embodiment for the resistance match. In the non-display area 102, the metal layer M1 includes a conductive line 213.

Figure 3A:
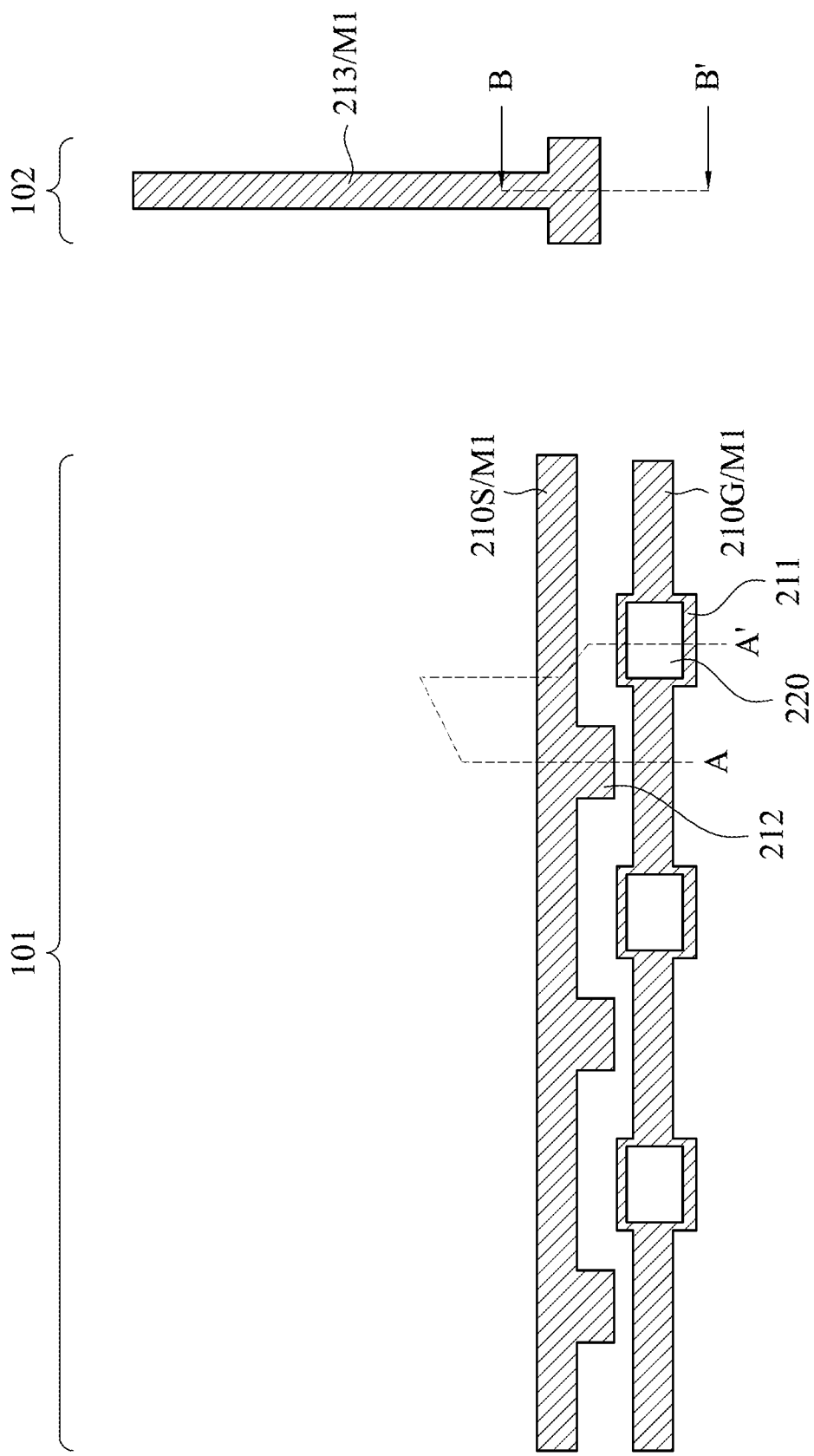
Figure 3B:
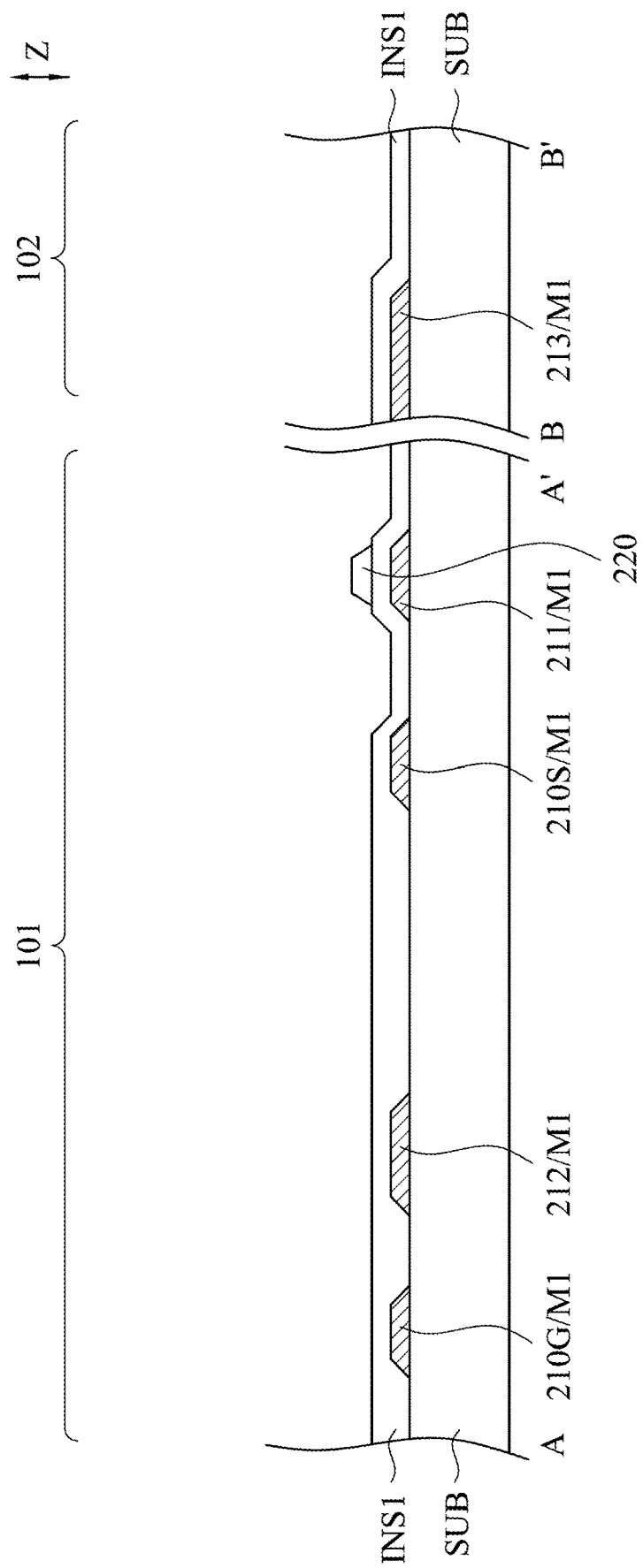

Referring to FIG. 3A and FIG. 3B, an insulation layer INS1 (also referred to a first insulation layer) is formed on the substrate SUB and the metal layer M1, and a patterned semiconductor layer 220 (by a second patterning process) is formed on the insulation layer INS1. The semiconductor layer 220 in FIG. 3B is merely shown for illustration. In another embodiments, an ohmic contact layer is disposed on the semiconductor layer 220, and the ohmic contact layer and the semiconductor layer 220 are formed by the same patterning process (not shown). The semiconductor layer 220 serves as a channel of the thin film transistor and is at least partially overlapped with the gates 211. The semiconductor layer 220 may be formed by amorphous silicon (a-Si) or an oxide semiconductor such as indium gallium zinc oxide (IGZO). The chemical formula of IGZO may be $In_{2-x}M_xO_3(Zn_{1-y}O)F$, where M denotes boron (B), aluminum (Al), or gallium (Ga); $0 \leq x \leq 2$; $0 \leq y \leq 1$; and F=0-6. For example, when x=1, M=Ga, y=0, and F=1, the formula of IGZO is $InGaZnO_4$. Besides, the shape of the semiconductor layer 220 in FIG. 3A is merely illustrated as an example, and the semiconductor layer 220 may have any shape in other embodiments.

Note that the term "overlap" mentioned in all embodiments of the specification means an overlapping viewed from a direction (i.e. Z axis) perpendicular to the substrate SUB. For example, if "a first unit is at least partially overlapped with a second unit" is written, it means the first unit is at least partially overlapped with the second unit when viewed from the direction perpendicular to the substrate SUB (i.e. Z axis along a normal vector of a top surface of the substrate SUB). In other words, a projection of the first unit onto the substrate SUB is at least partially overlapped with a projection of the second unit onto the substrate SUB. If "the first unit is overlapped with the second unit" is written, it means that the first unit may be partially overlapped with the second unit, or the first unit may be completely overlapped with the second unit when viewed from the direction perpendicular to the substrate SUB. Furthermore, the phrase "first unit covers second unit" mentioned in the specification means that the first unit is above the second unit and the first unit is at least partially overlapped with the second unit when viewed from the direction perpendicular to the substrate SUB. In the invention, the first unit and the second unit may be a transparent electrode, an insulation layer, a metal layer, an opening, a touch sensing line, a data line, a scan line, etc.

Figure 4A:
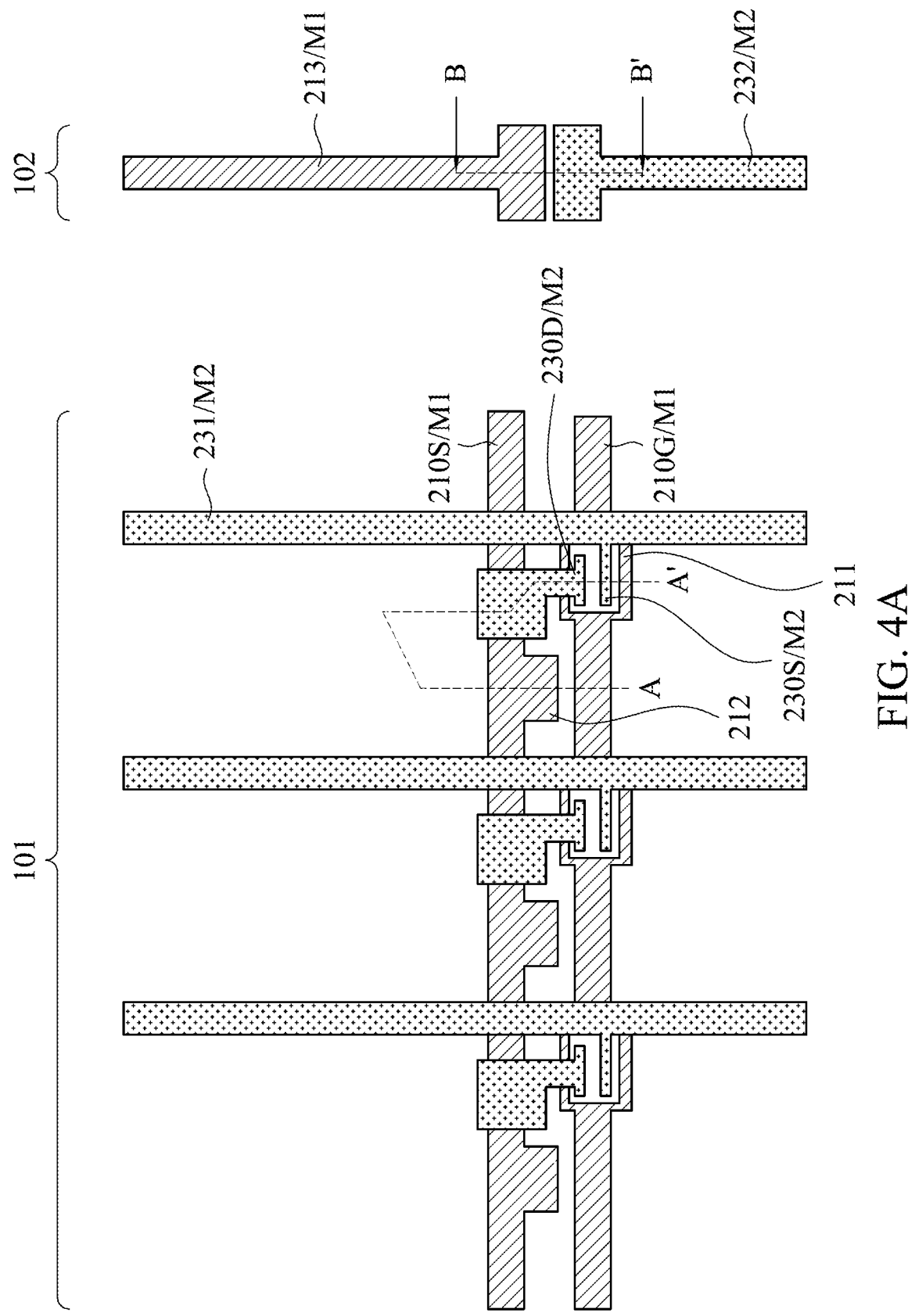
Figure 4B:
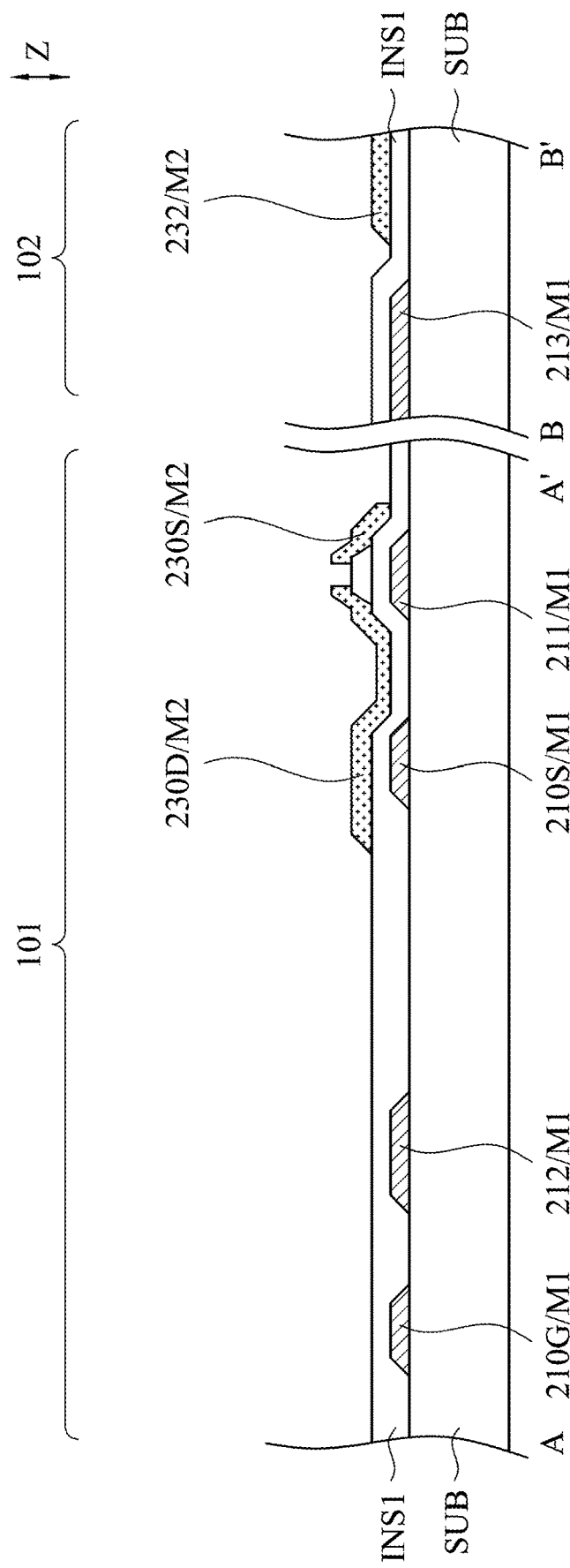

Referring to FIG. 4A and FIG. 4B, a third patterning process is performed to form a patterned second conducting layer (may be metal or non-metal) such as a metal layer M2 (also referred to a second metal layer) on the insulation layer INS1. The metal layer M2 may be a single layer of metal or a stack of multiple metal layers, which is not limited in the invention. In the display area 101, the metal layer M2 includes a drain 230D, a source 230S, and a data line 231 which is connected to the source 230S. In the non-display area 102, the metal layer M2 includes a conductive line 232. In some embodiments, the drain 230D covers a portion of the touch sensing line 210S.

Figure 5A:
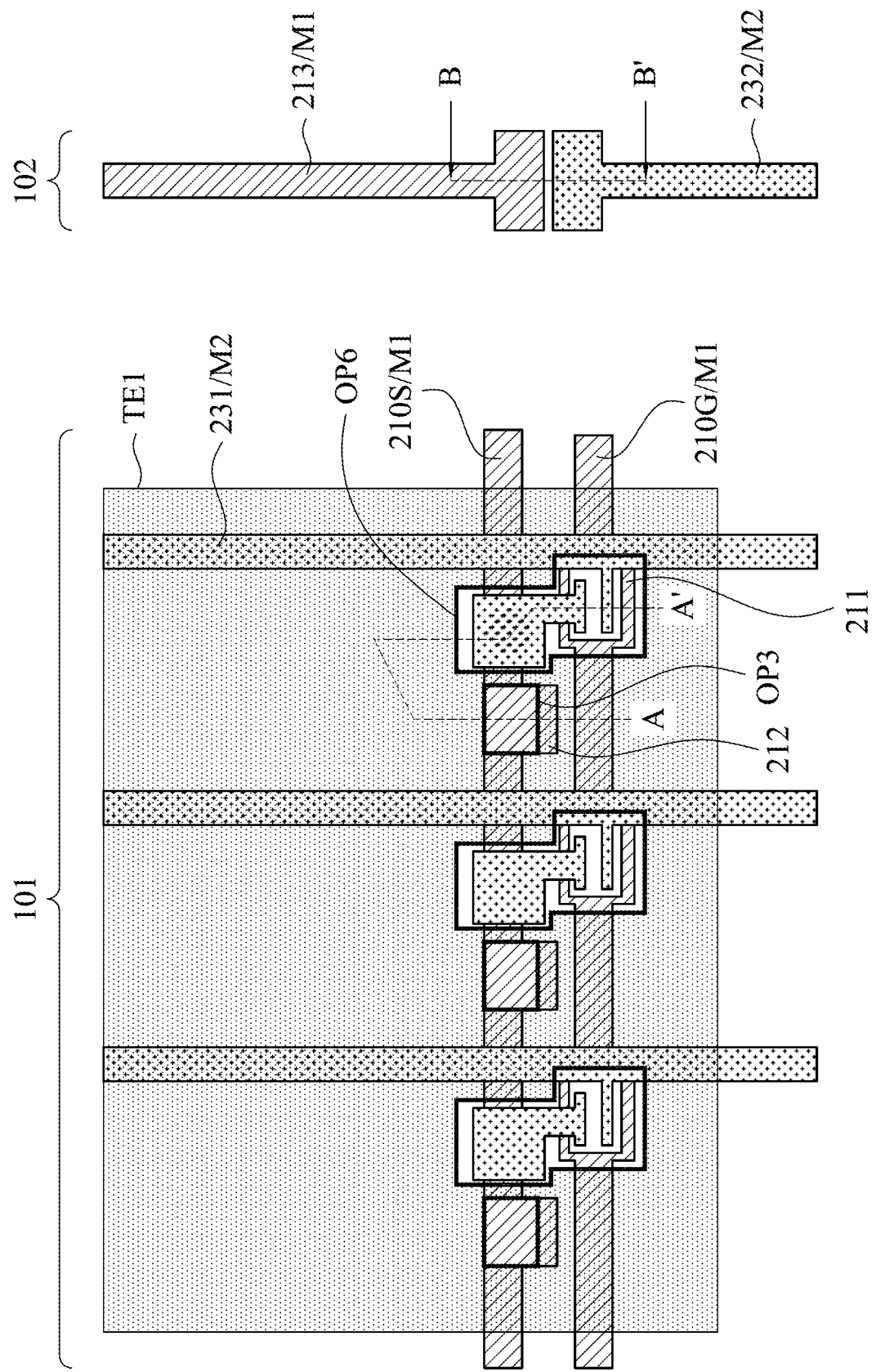
Figure 5B:
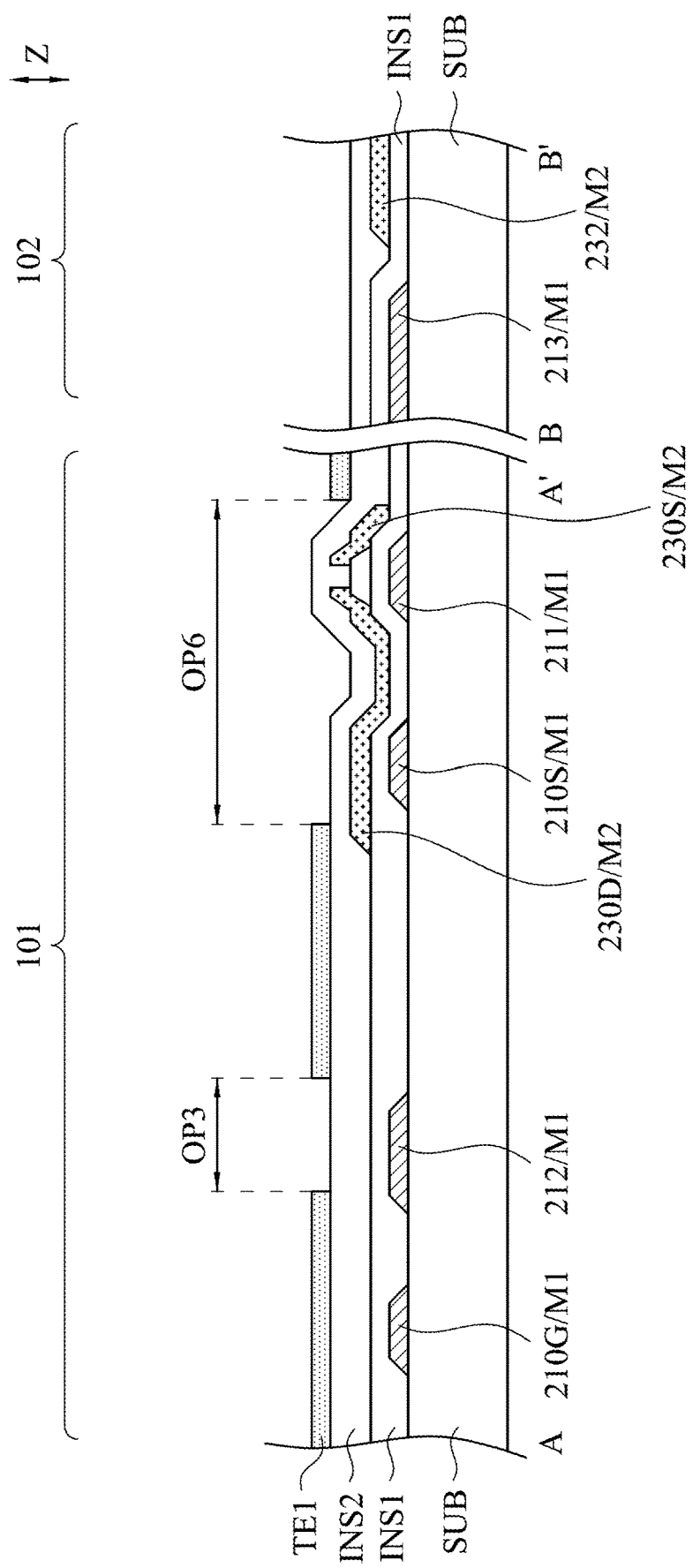

Referring to FIG. 5A and FIG. 5B, an insulation layer INS2 (also referred to a second insulation layer) is formed on the insulation layer INS1 and on the metal layer M2. A patterned electrode TE1 (also referred to a first electrode or a common electrode) on the insulation layer INS2 (by a fourth patterning process). The electrode TE1 has an opening OP3 (also referred to a third opening) and an opening OP6 (also referred to a sixth opening). When viewed from the direction perpendicular to the substrate SUB, the opening OP6 is at least partially overlapped with the drain 230D, the semiconductor layer 220, and the source 230S. In this embodiment, the opening OP3 is partially overlapped with the extending pad 212, but the opening OP3 may be completely overlapped with the extending pad 212 in other embodiments. In some embodiments, the area of the opening OP6 is larger than that of the opening OP3. In other embodiments, the extending pad 212 is deleted, and the touch sensing line 210S is partially overlapped with the opening OP3 (not shown). The opening OP6 is used to reduce the induced current in the semiconductor layer 220 that is generated by the electrode TE1 (i.e. common electrode or pixel electrode). When the magnitude of the induced current in the semiconductor layer 220 is in a tolerable range, a leakage current of the TFT, when it is turned off, is decreased, and thus panel problems such as uneven brightness and cross-talk can be addressed.

Figure 6A:
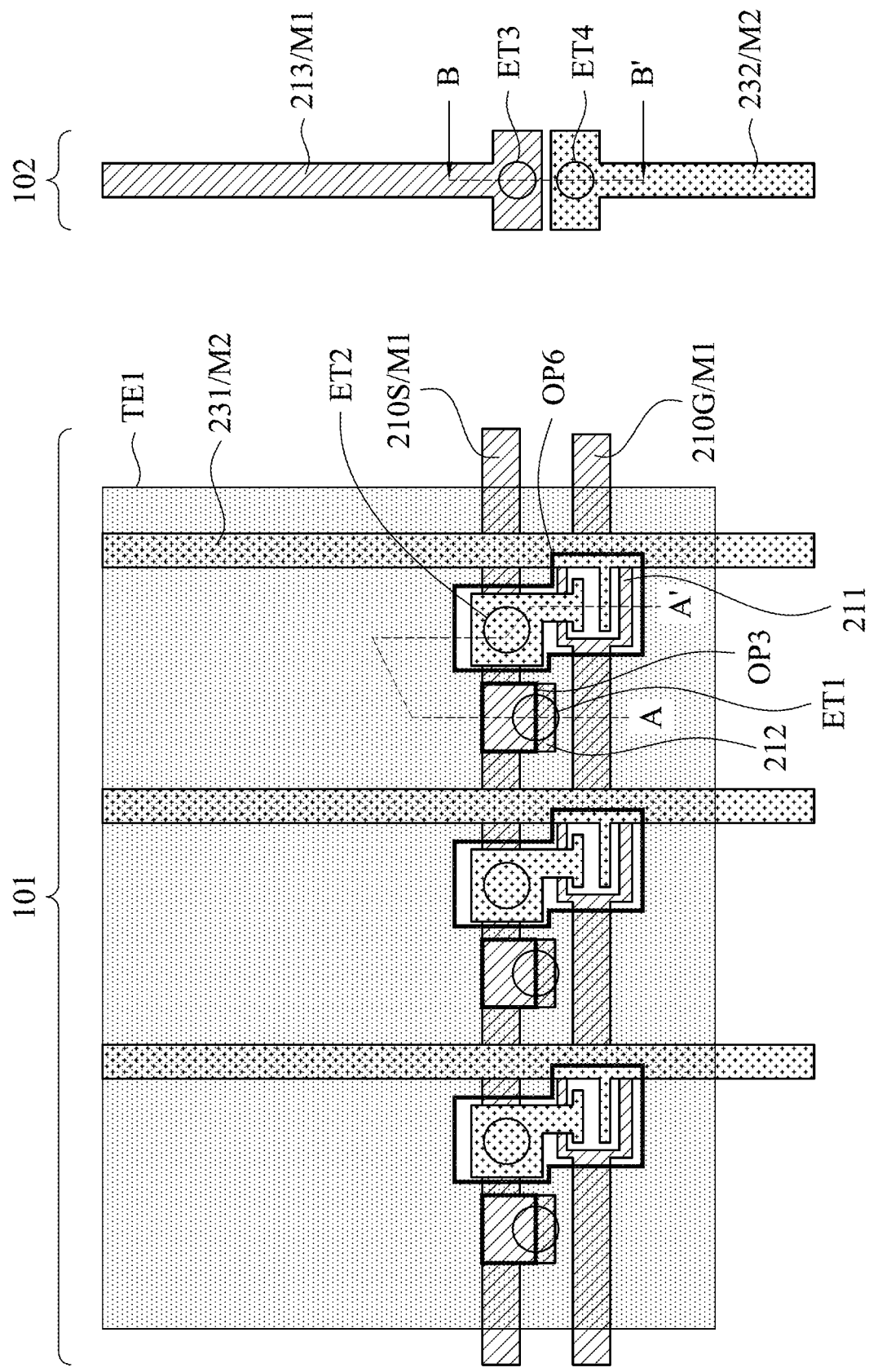
Figure 6B:
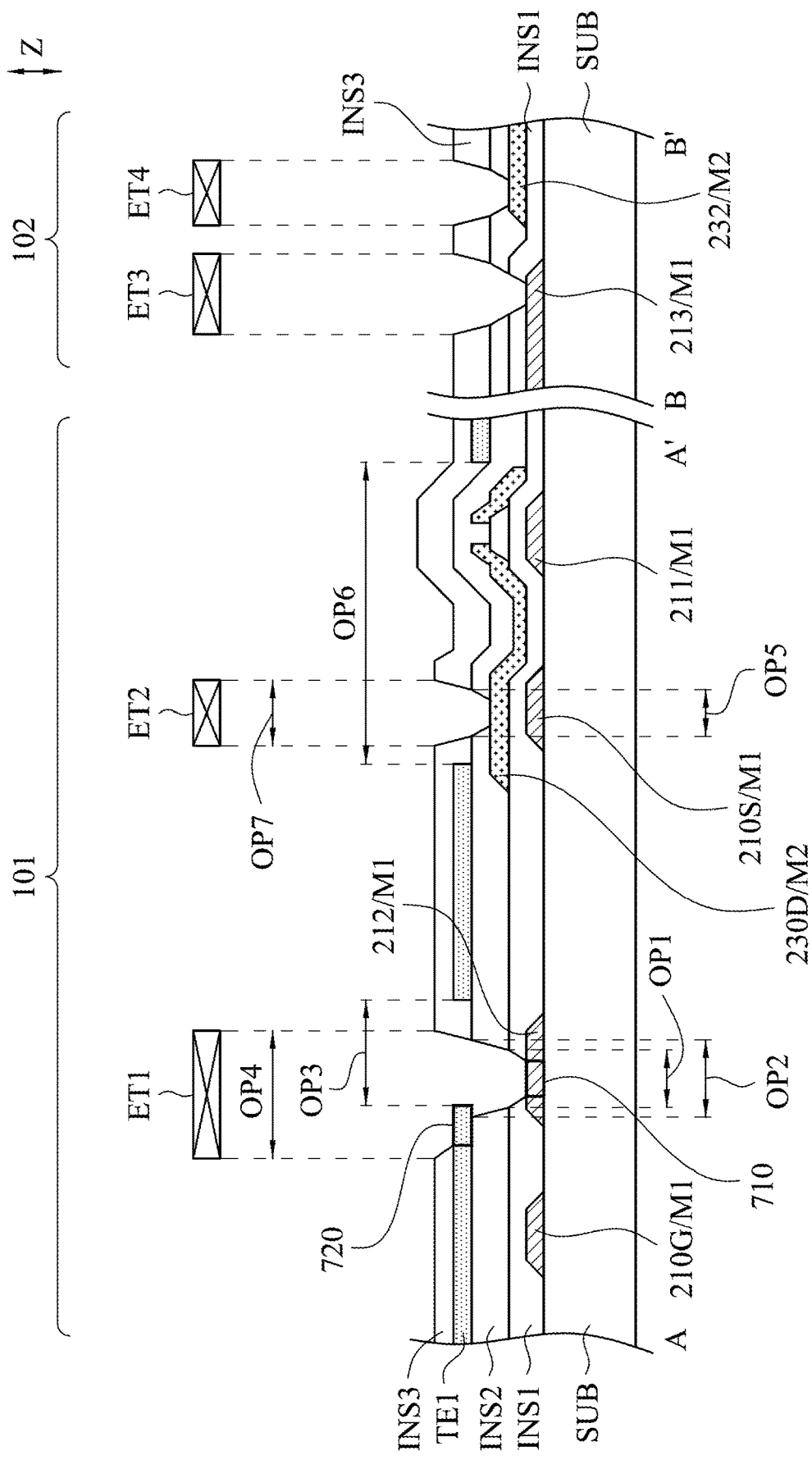

Referring to FIG. 6A and FIG. 6B, an insulation layer INS3 (also referred to a third insulation layer) is formed on the electrode TE1. An etching process (i.e. a fifth patterning process) for the material of the insulation layers INS1-INS3 is performed in the etching areas ET3 and ET4, so as to form openings in the insulation layer INS1-INS3 to expose the conductive lines 213 and 232 in the non-display area 102.

In the display area 101, the etching process (i.e. fifth patterning process) for the material of the insulation layers INS1-INS3 is performed in the etching areas ET1 and ET2, so as to form an opening OP4 (also referred to a fourth opening) and an opening OP7 (also referred to a seventh opening) in the insulation layer INS3; to form an opening OP2 (also referred to a second opening) corresponding to the opening OP1 and an opening OP5 (also referred to a fifth opening) in the insulation layer INS2; and to form an opening OP1 (also referred to a first opening) in the insulation layer INS1. In this embodiment, a dry etching is preferred, but a wet etching may be adopted. In detail, referring to FIG. 6B, the opening OP7 is overlapped with the etching area ET2; the opening OP5 is overlapped with the opening OP6 and the opening OP7; and the opening OP5 exposes a portion of the drain 230D. In addition, when viewed from the direction (i.e. Z axis) perpendicular to the substrate SUB, the opening OP4 is overlapped with the etching area ET1; the opening OP4 is partially overlapped with the opening OP3; and a portion of the opening OP4 that is not overlapped with the opening OP3 exposes a portion of the electrode TE1. Herein, the portion of the electrode TE1 exposed by the opening OP4 is referred to a second connection part 720. Moreover, the extending pad 212 is overlapped with the opening OP4 when viewed from the direction perpendicular to the substrate SUB, and a portion of the metal layer M1 (may be extending pad 212 or touch sensing line 210S) exposed by the opening OP1 is referred to a first connection part 710. In the area of the opening OP3 that is not overlapped with the opening OP4, the insulation layer INS3 is in direct contact with the insulation layer INS2. The area that the opening OP4 overlaps with the opening OP3 is at least partially overlapped with the opening OP2. From another aspect, when etching the insulation layers INS1-INS3 in the etching area ET1, the electrode TE1 exposed by the opening OP4 (i.e. the second connection part 720) serves as a mask layer. For example, the material of the insulation layers INS1-INS3 is SiOx, SiNy, or a stacked layer thereof. The material of the electrode TE1 may be, for example, ITO. When a dry etching process is adopted, the second connection part 720 of the electrode TE1 serves as a mask to shield the insulation layer INS2 beneath the second connection part 720 from the non-isotropic physical bombardment of the dry etching. However, the insulation layer INS2 is still etched by the etching process through the opening OP3 of the electrode TE1 to form the opening OP2. Meanwhile, the second connection part 720 exposed by the opening OP4 partially overlaps with the opening OP2 when viewed from the direction perpendicular to the substrate SUB. In general, during the etching process forming the openings OP2 and OP1, the insulation layer INS2 may be still etched along a direction parallel with the substrate (i.e. X or Y direction), resulting in that a phenomenon of "under cutting" occurs beneath the electrode TE1. In an ideal situation, the phenomenon of "under cutting" may not occur. When a wet etching process is adopted, the isotropic etching toward the insulation layer INS2 may cause obvious phenomenon of "under cutting" beneath the electrode TE1, resulting in that the top and bottom surfaces of the second connection part 720 are exposed. In this embodiment, the etching area ET1 (i.e. the area of the opening OP4) overlaps with the extending pad 212 and the opening OP3 to form the openings OP2 and OP1 exposing a portion of the extending pad 212/touch sensing line 210S. In addition, when the phenomenon of "under cutting" occurs, a portion of the second connection part 720 overlaps with the opening OP2.

Figure 6C:
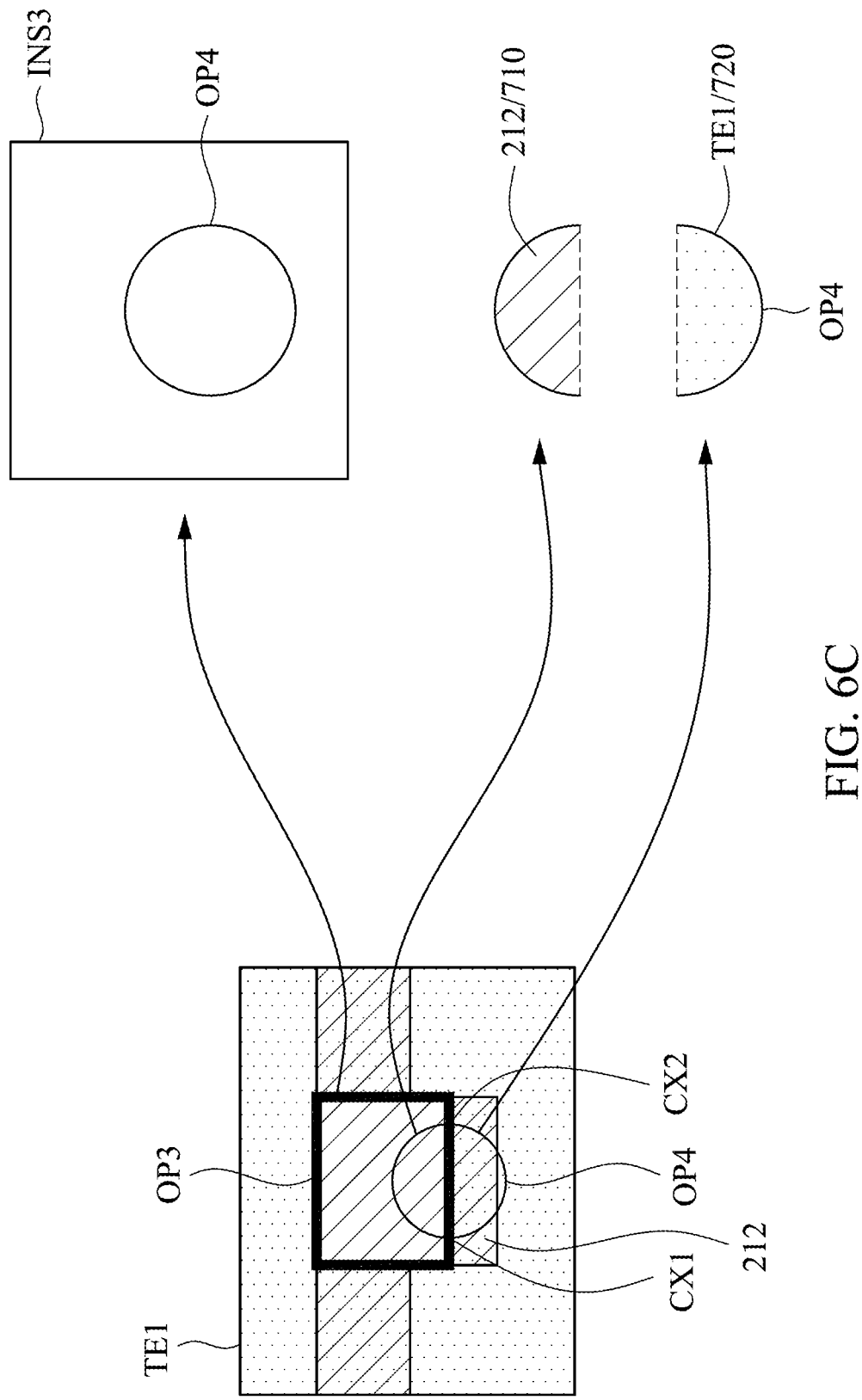
FIG. 6C is an enlarged diagram around an etching area ET1 of FIG. 6A.

Referring to FIG. 6C which is an enlarged diagram around the etching area ET1 of FIG. 6A. In FIG. 6C, when viewed from the direction perpendicular to the substrate SUB, the contour of the opening OP4 and the contour of the opening OP3 intersect at at least two locations CX1, CX2, and a portion of the contour of the opening OP4 is located in the area of the opening OP3. Referring to FIG. 6B and FIG. 6C, when viewed from the top view (viewed from Z axis), an area around the etching area ET1 includes several different materials based on the ranges of the opening OP3 and the opening OP4. First, the material not in the opening OP4 is the insulation layer INS3; second, the material in the both of the opening OP1 and the opening OP4 is the extending pad 212; third, the material in the opening OP4 but not in the opening OP3 is the electrode TE1; the material in the opening OP4 forming ramps is the insulation layers INS1, INS2, and INS3. In FIG. 6C, the exposed extending pad 212 is referred to as the first connection part 710, and the portion of the electrode TE1 exposed by the opening OP4 is referred to as the second connection part 720. The dash lines of the first connection part 710 and the second connection part 720 represent the locations where "under cutting" may occur. In some embodiments, a ratio of the area of the second connection part 720 exposed by the opening OP4 to the area of the opening OP4 is in a range from 0.1 to 1.

Figure 7A:
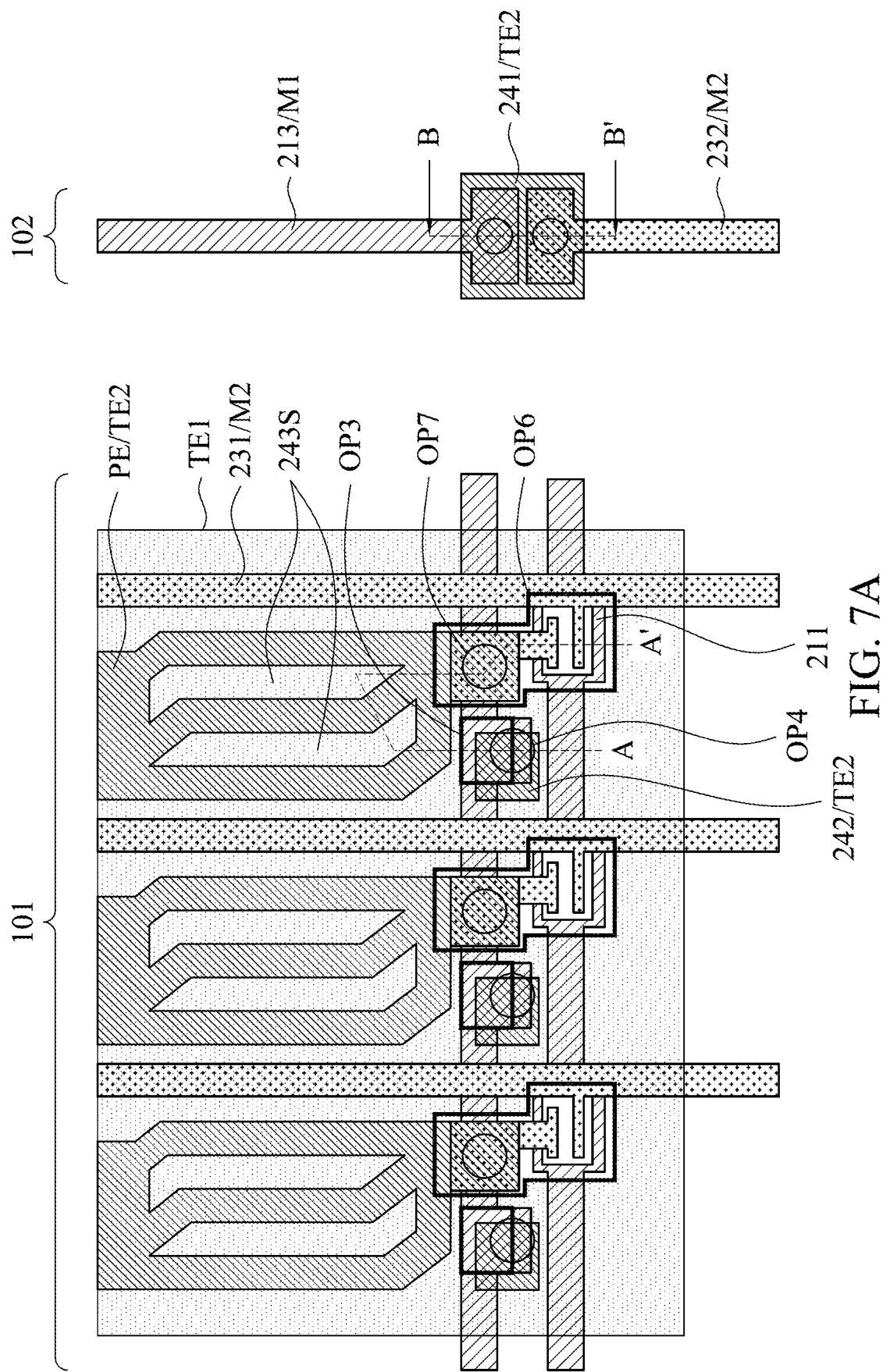
Figure 7B:
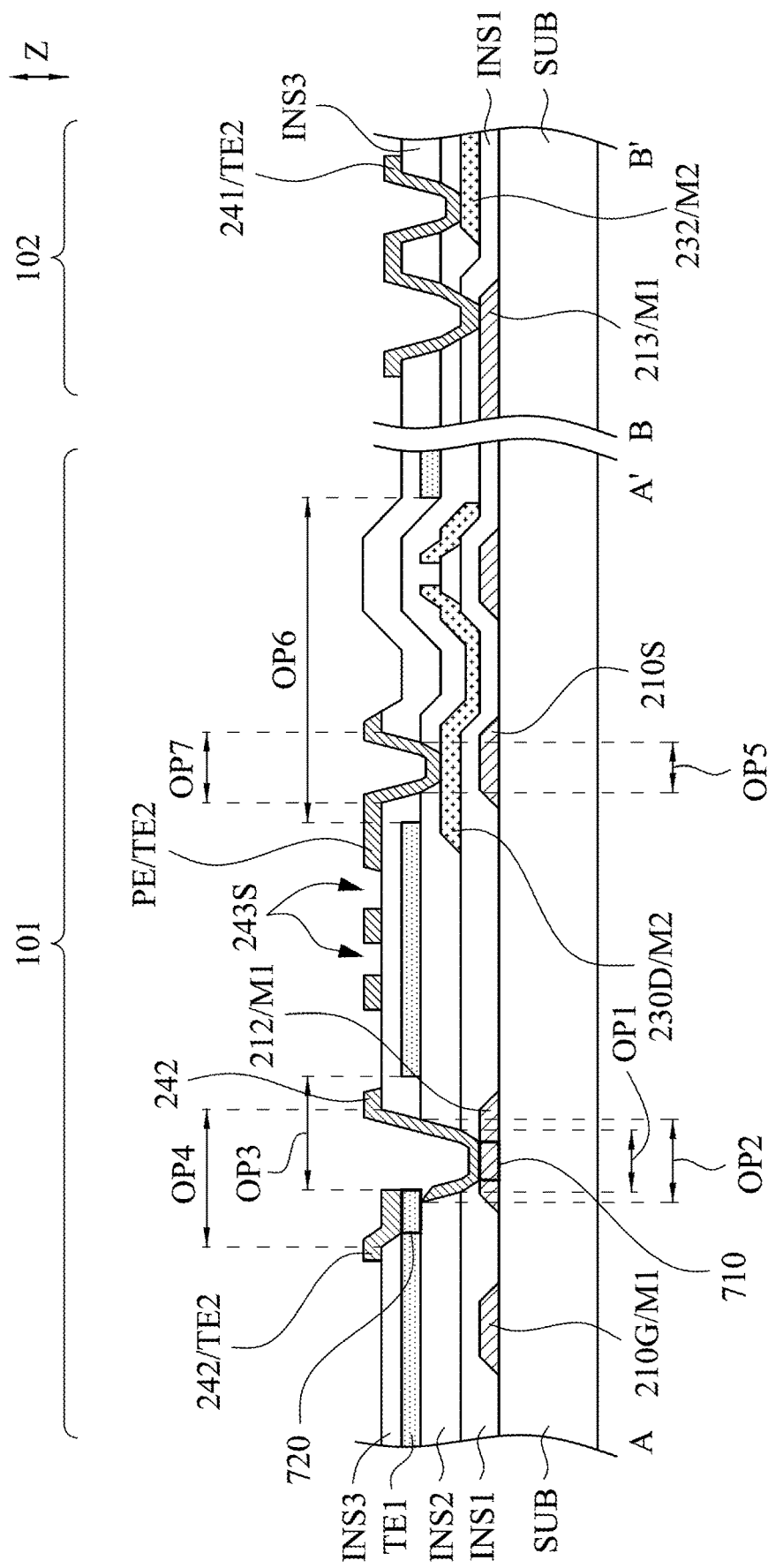

Referring to FIG. 7A and FIG. 7B, a patterned electrode TE2 (also referred to a second transparent electrode) is formed on the insulation layer INS3 (i.e. the third insulation layer) by a sixth patterning process. In the non-display area 102, the electrode TE2 includes a connection electrode 241 for electrically connecting to the conductive line 213 and the conductive line 232.

In the display area 101, the electrode TE2 includes a connection electrode 242 and a pixel electrode PE. The pixel electrode PE is electrically connected to the drain 230D through the openings OP5-OP7. In some embodiments, the pixel electrode PE has a slit pattern that means the pixel electrode PE has one or more slit 243S. For example, two slits 243S are shown in the FIG. 7B. In this case, the electrode TE1 serves as the common electrode, and the electric field between the pixel electrode PE and the common electrode is configured to orient the liquid crystal molecular. In addition, the touch sensing line 210S is at least partially overlapped with the drain 230D and the pixel electrode PE. In this embodiment, the slits 243S extend along a vertical direction, but the slits 243S may extend along any direction. For example, an angle of 0-90 degrees (not shown) may be formed between the extending direction and the scan line.

Figure 7C:
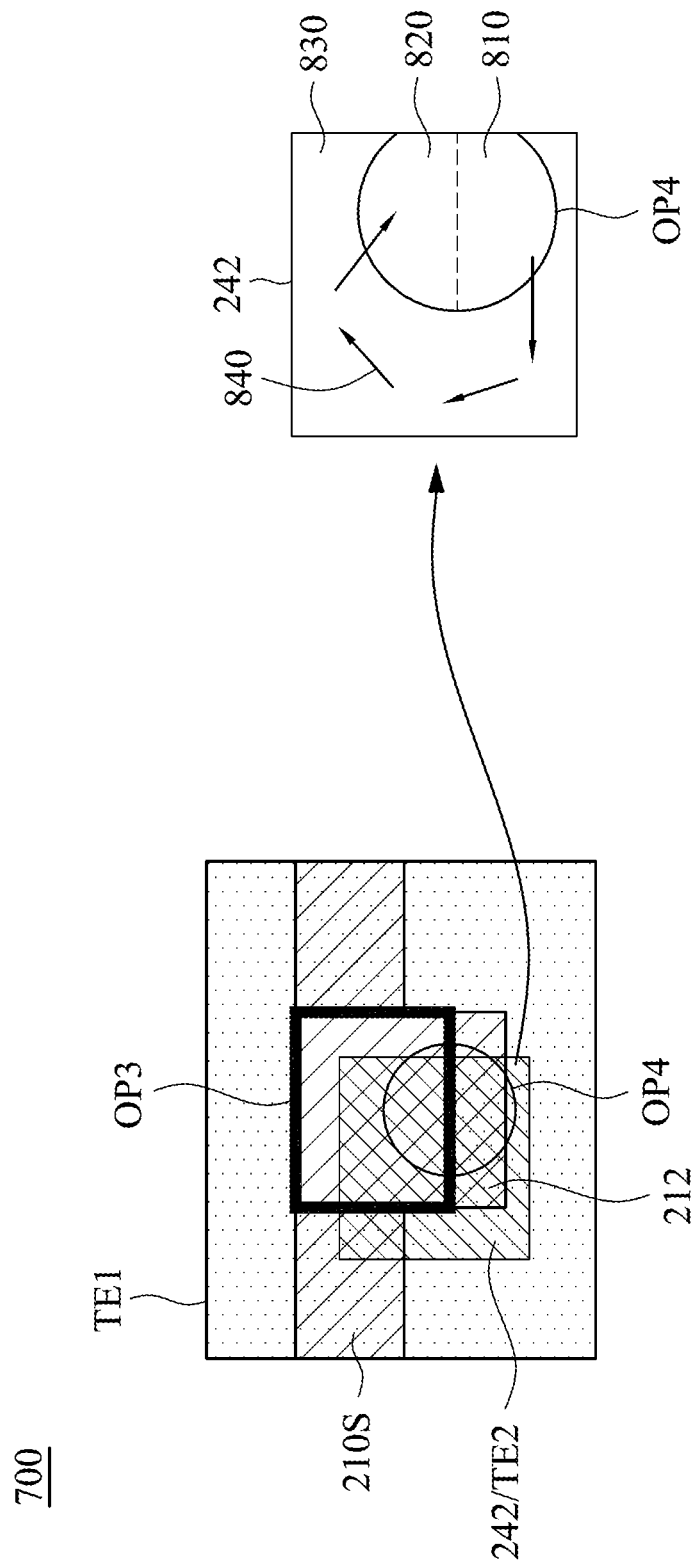
FIG. 7C is an enlarged diagram around an etching area ET1 of FIG. 7A.

The connection electrode 242 electrically connects the first connection part 710 with the second connection part 720 through the openings OP1-OP4. To be specific, FIG. 7C is an enlarged diagram around the etching area ET1 of FIG. 7A. What is shown in FIG. 7C is also referred to a contact structure 700. The contact structure 700 includes all or part of the following units: connection electrode 242, insulation layer INS3, connection part 710 of electrode TE1, insulation layer INS2, touch sensing line 210S/extending pad 212 (i.e. first connection part 720 of the second metal layer). Referring to FIG. 6C and FIG. 7C, the connection electrode 242 is at least partially overlapped with the opening OP4 and the opening OP3. The connection electrode 242 includes three portions 810, 820, and 830 when viewed from the direction (i.e. Z axis) perpendicular to the substrate SUB. The first portion 810 which is in the opening OP4 but not in the opening OP3 is in direct contact with the second connection part 720. The second portion 820 which is both of the opening OP4 and OP3 is in contact with the first connection part 710. The third portion 830, which is not in the opening OP4, is in direct contact with the insulation layer INS3. For simplification, the ramps of the insulation layers INS1, INS2, and INS3 in the opening OP4 are omitted in FIG. 7C. In particular, the dash line between the first portion 810 and the second portion 820 represent the locations where the phenomenon of "under cutting" may occur. Accordingly, the first portion 810 may not effectively and electrically connect to the second portion 820. However, the first portion 810 and the second portion 820 are both connected to the third portion 830, and therefore the first portion 810 is electrically connected to the second portion 820 through the third portion 830 (e.g. along a conductive path 840). When the phenomenon of "under cutting" occurs, the connection electrode 242 may not be able to effectively and electrically connect the first electrode TE1 to the touch sensing line 210S. Herein, "not effectively and electrically connected to" means that, for example, the connection electrode 242 is completely cut off/disconnected between the first portion 810 and the second portion 820, or although the connection electrode 242 is not cut off between the first portion 810 and the second portion 820, the thickness of the electrode in a local area, where the dash line is drawn, is too thin, resulting in higher resistance than normal situation. As a result of the embodiment, even the connection electrode 242 is cut off between the first portion 810 and the second portion 820, the extending pad 212/touch sensing line 210S formed by the second metal layer can still be effectively and electrically connected to the electrode TE1 (i.e. the touch electrode).

In some embodiments, an area of the electrode TE2 contacting the first connection part 710 is defined as a first contacting area. An area of the electrode TE2 contacting the second connection part 720 is defined as a second contacting area. A ratio of the first contacting area to the second contacting area is in a range from 0.1 to 10.

Figure 7D:
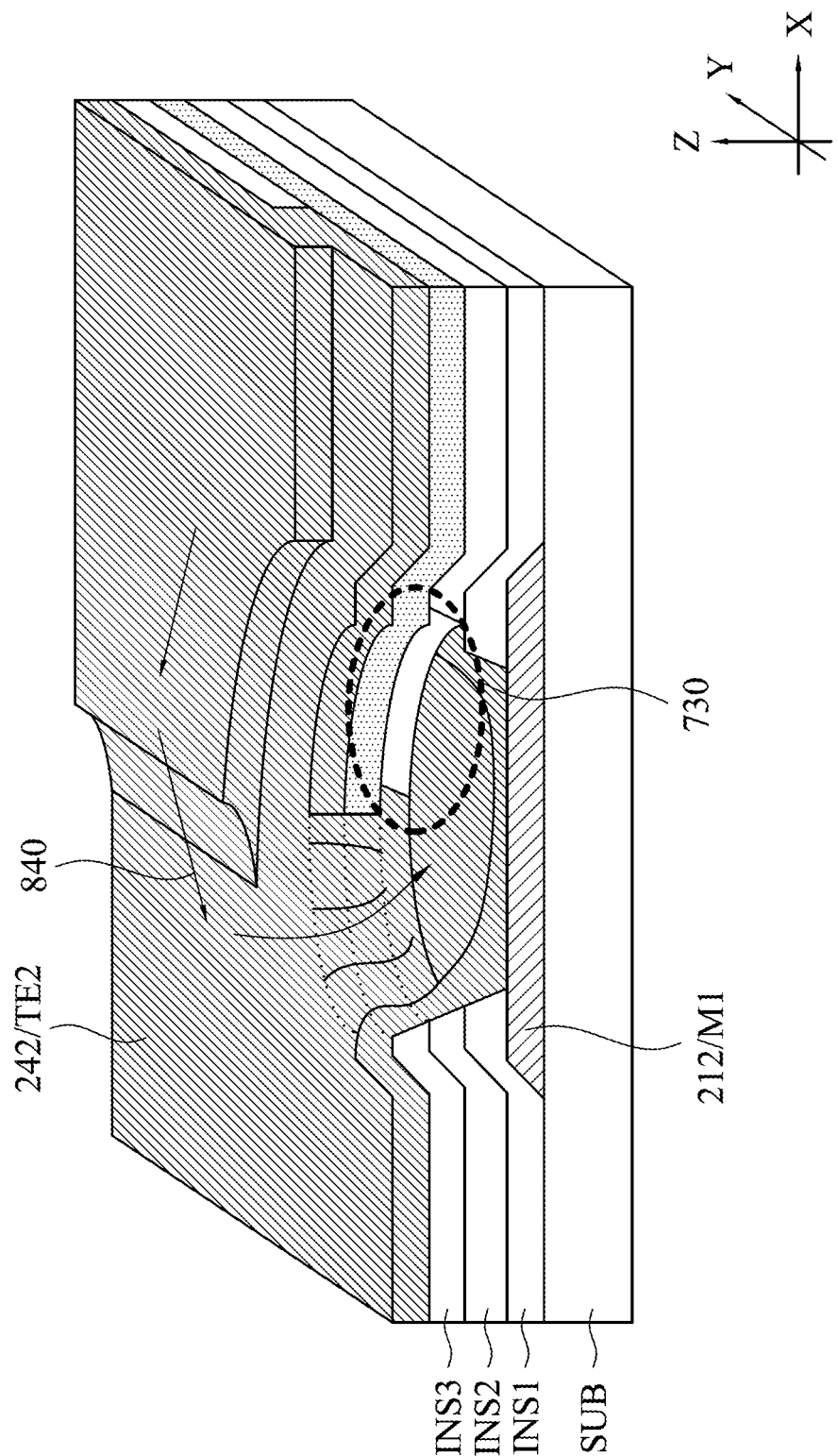
FIG. 7D is a perspective view of a conductive path in a contact structure in accordance with an embodiment.

FIG. 7D is a perspective view of a conductive path in the contact structure in accordance with an embodiment. Referring to FIG. 7C and FIG. 7D, the area 730 of FIG. 7D has the phenomenon of "under cutting" because the insulation layer INS2 is excessively etched, causing that the electrode TE2 (i.e. connection electrode 242) is not connected to the extending pad 212 in the area 730. However, the electrode TE2 (connection electrode 242) can be electrically connected to the extending pad 212 through the conductive path 840. Therefore, referring to FIG. 7C again, in the embodiment, the opening OP4 has to partially overlaps with the opening OP3, and the area that the opening OP4 overlaps with the opening OP3 has to partially overlaps with the extending pad 212. In addition, the connection electrode 242 has to cover at least a portion of the opening OP3 and at least a portion of the opening OP4. In some embodiments, the area of the connection electrode 242 is larger than that of the opening OP4. In some embodiments, the connection electrode 242 covers over half of the opening OP4, and at least in contact with the first connection part 710, the second connection part 720 and a portion of the insulation layers INS1-INS3 in the opening OP4.

Based on the embodiment of described above, only six photolithography processes (i.e. FIG. 2A to FIG. 7B) are required to manufacture the display panel including the touch electrodes such as an display panel applied in a Fringe Field Switching (FFS) liquid crystal display panel with embedded touch function. Accordingly, the manufacturing cost is reduced and the yield rate is increased.

In the aforementioned embodiments, the material of the substrate SUB may include glass, polymer, polyethylene terephthalate (PET), polycarbonate (PC), polyether sulfone (PES), triacetyl cellulose (TAC), PMMA, polyethylene, COP, polyimide (PI), and a compound material constituted by PC and PMMA, which is not limited in the invention. The material of the transparent electrodes TE1, TE2 may include indium tin oxide (ITO), indium zinc oxide (IZO), antimony tin oxide (ATO), fluorine tin oxide (FTO) or other conductive and transparent material such as a Nano-metal wire (e.g. nano-silver wire, nano-copper wire).

The metal layer in the specification may be a single layer of aluminum, copper, titanium, tungsten, etc. or a compound layer of molybdenum-aluminum-molybdenum, titanium-aluminum-titanium, titanium-copper-titanium, etc. which is not limited in the invention. On the other hand, the insulation layer in the specification may be silicon nitride, silicon oxide, silicon oxynitride or other suitable insulation layers. Furthermore, one insulation layer shown in the figures may include two or more than two insulation layers stacked with each other with different material. In addition, when "expose" is written in the specification, it means that the unit below is partially exposed, or completely exposed in accordance with the requirement, which is not limited in the invention.

Figure 8A:
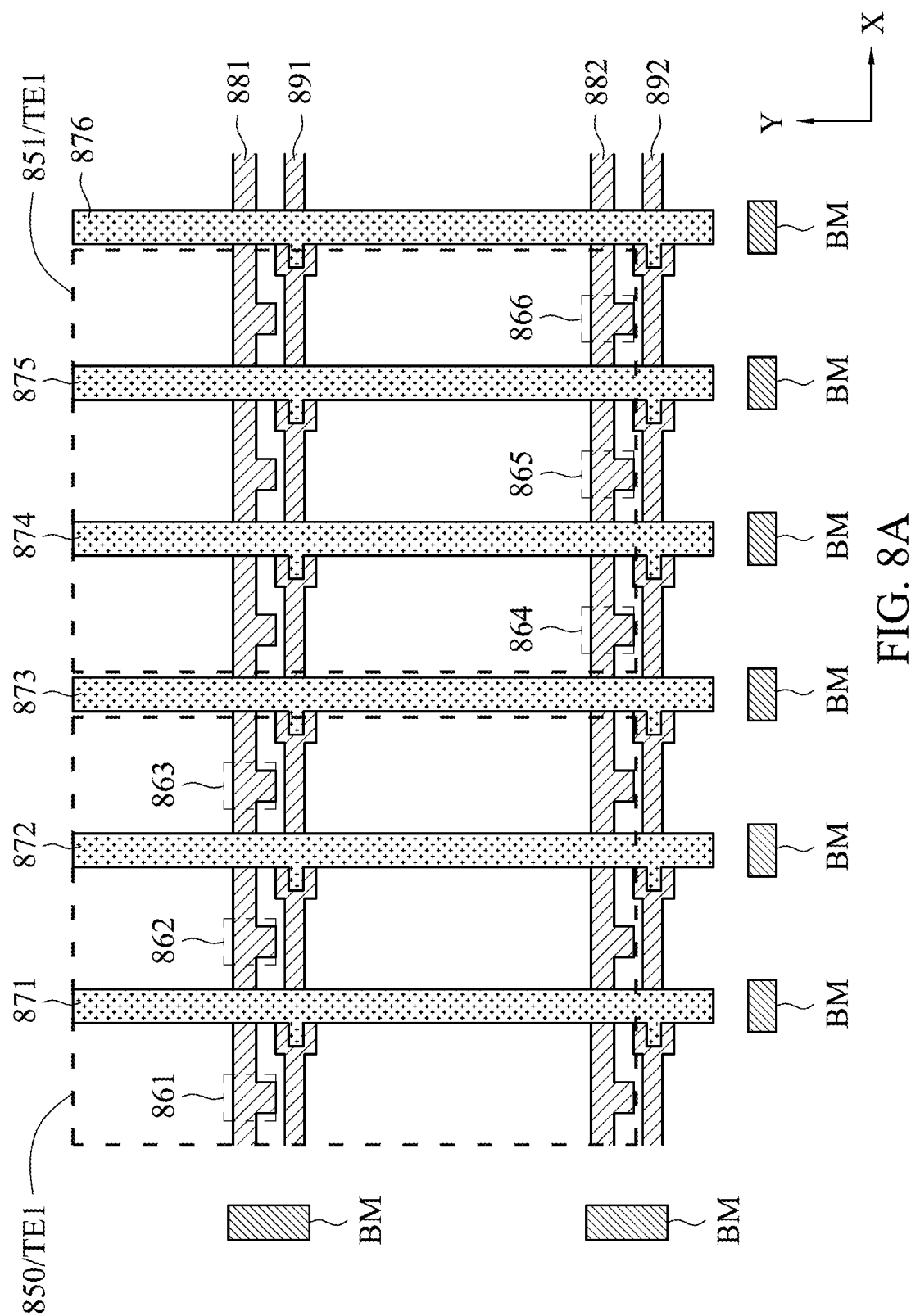
FIG. 8A is a schematic top view of multiple touch electrodes and pixel structures in accordance with an embodiment.

FIG. 8A is a schematic top view of multiple touch electrodes and pixel structures in accordance with an embodiment. Referring to FIG. 8A, in the embodiment of FIG. 8A, two electrodes 850 and 851 are shown. Each touch electrode includes the first electrode TE1 for 6 pixel structures and 3 contact structures. For simplification, only data lines 871-876, touch sensing lines 881, 882, touch electrodes 850, 851, contact structures 861-866, and scan lines 891, 892 are illustrated in FIG. 8A, and thin film transistors, pixel electrodes, openings of the touch electrodes, etc. are omitted. In addition, the details of the contact structures 861-866 are referred to FIG. 7A to FIG. 7C, the units included in the contact structures 861-866 are not shown in FIG. 8A.

In some embodiments, one touch sensing line is disposed at each row of sub-pixels for reducing an uneven visional effect. That is to say, the number of the scan lines is equal to that of the touch sensing lines, but the invention is not limited thereto. In other embodiments, the number of the scan lines is N times of that of the touch sensing lines where N may be any positive number. Herein, the touch sensing lines indicate the lines which receive touch sensing signals, and floating or dummy lines that do not receive the touch sensing signals are not counted.

Each touch electrode corresponds to at least one contact structure. For example, the touch electrode 850 is electrically connected to the touch sensing line 881 through the contact structures 861-863; and the touch electrode 851 is electrically connected to the touch sensing line 882 through the contact structures 864-866. No contact structure is disposed on the touch sensing line 881 in the area of the touch electrode 851, and not contact structure is disposed on the touch sensing line 882 in the area of the touch electrode 850. In other embodiments, each touch electrode is electrically connected to one touch sensing line through more or less contact structures. In the embodiment of FIG. 8A, multiple extending pads are disposed on the touch sensing line 881 in the area of the touch electrode 851, but these extending pads may be deleted in other embodiments if the touch sensing line 881 is wide enough. Similarly, the extending pads on the touch sensing line 882 in the area of the touch electrode 850 may be deleted.

The touch electrodes 850 and 851 are spaced from the each other by a distance, and therefore the touch electrodes 850 and 851 are electrically insulated from the each other. The touch electrodes 850 and 851 receive Vcom signal from the touch sensing lines 881 and 882 respectively in the display period, and receive touch sensing signals in the touch sensing period.

The display panel further includes a black matrix BM for covering the data lines, the touch sensing lines, the scan lines, TFTs, etc. For clarity, only a portion of the black matrix BM in the periphery area is shown in FIG. 8A. It should be appreciated that the black matrix extends horizontally (i.e. along X direction) and vertically (i.e. along Y direction). For example, the black matrix BM vertically extends to cover the data lines 871-876, and extends horizontally to cover the touch sensing lines 881, 882 and the scan lines 891, 892.

Figure 8B:
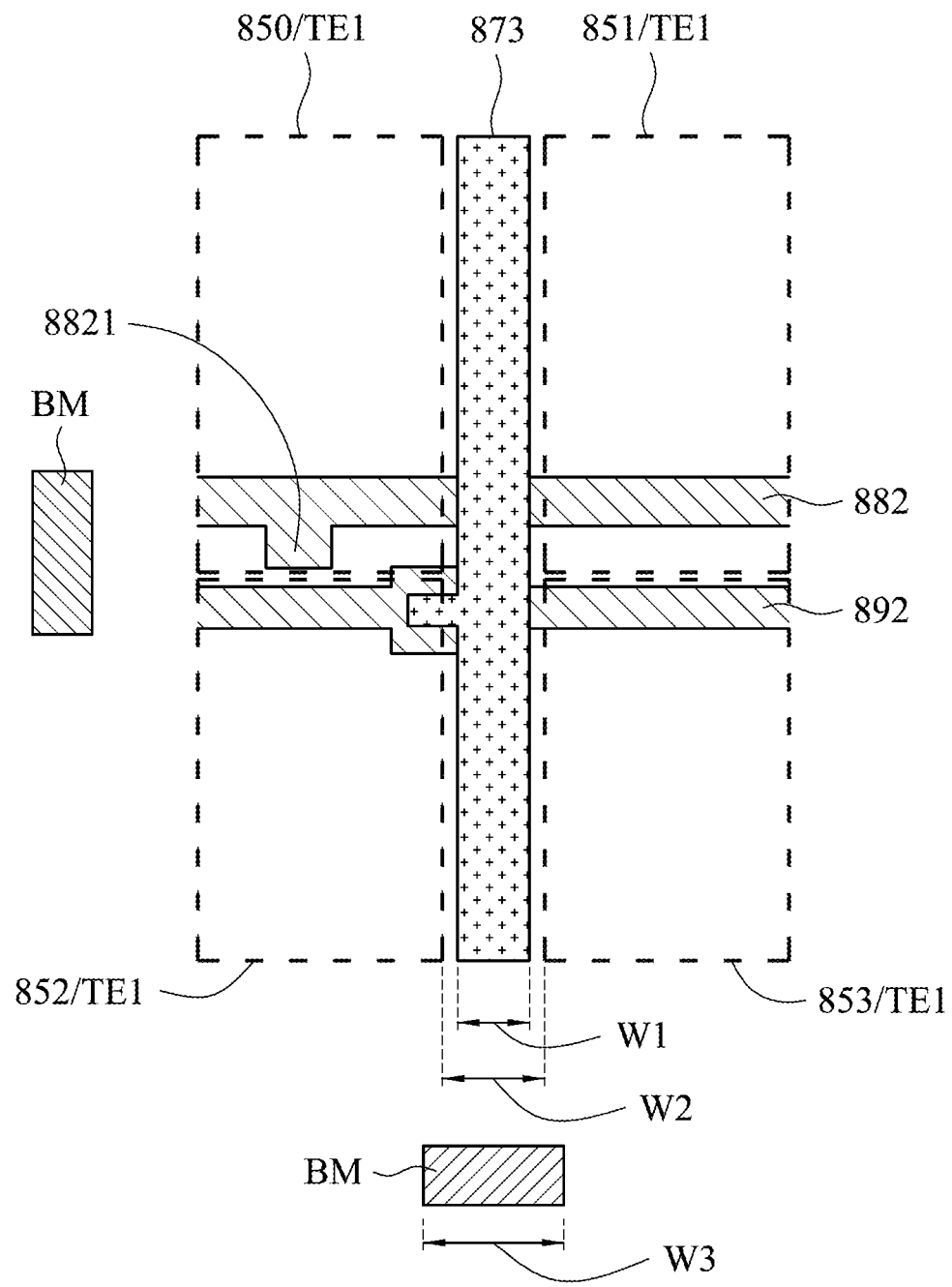
FIG. 8B is an enlarged diagram around boundaries of the touch electrodes in accordance with an embodiment.

FIG. 8B is an enlarged diagram around boundaries of the touch electrodes in accordance with an embodiment. Referring to FIG. 8B, the touch electrodes 850-853 are electrically insulated from each other. The touch electrode 852 is spaced from the touch electrode 853 at a distance w2, the data line 873 has a width w1, and the black matrix BM which vertically extends has a width w3, where w3>w2>w1. In particular, the touch electrodes 852 and 853 do not cover the data line 873 to prevent the signal transmitted on the data line 873 from being interfered by the voltage of the touch electrodes 852 and 853. However, in some embodiments, the touch electrodes 852 and 853 may partially cover the data line 873.

On the other hand, the black matrix BM which horizontally extends would cover the scan line 892 and the touch sensing line 882. The touch electrodes 850, 851 cover the touch sensing line 882 but does not cover the scan line 892. In some embodiments, the upper edges of the touch electrodes 852, 853 are spaced from the upper edge of the scan line 892 by at least 0.5 micro meter; and the bottom edges of the touch electrodes 850, 851 are spaced from the bottom edge of the touch sensing line 882 (including the extending pad 8821) at least 0.5 micro meter.

Figure 9:
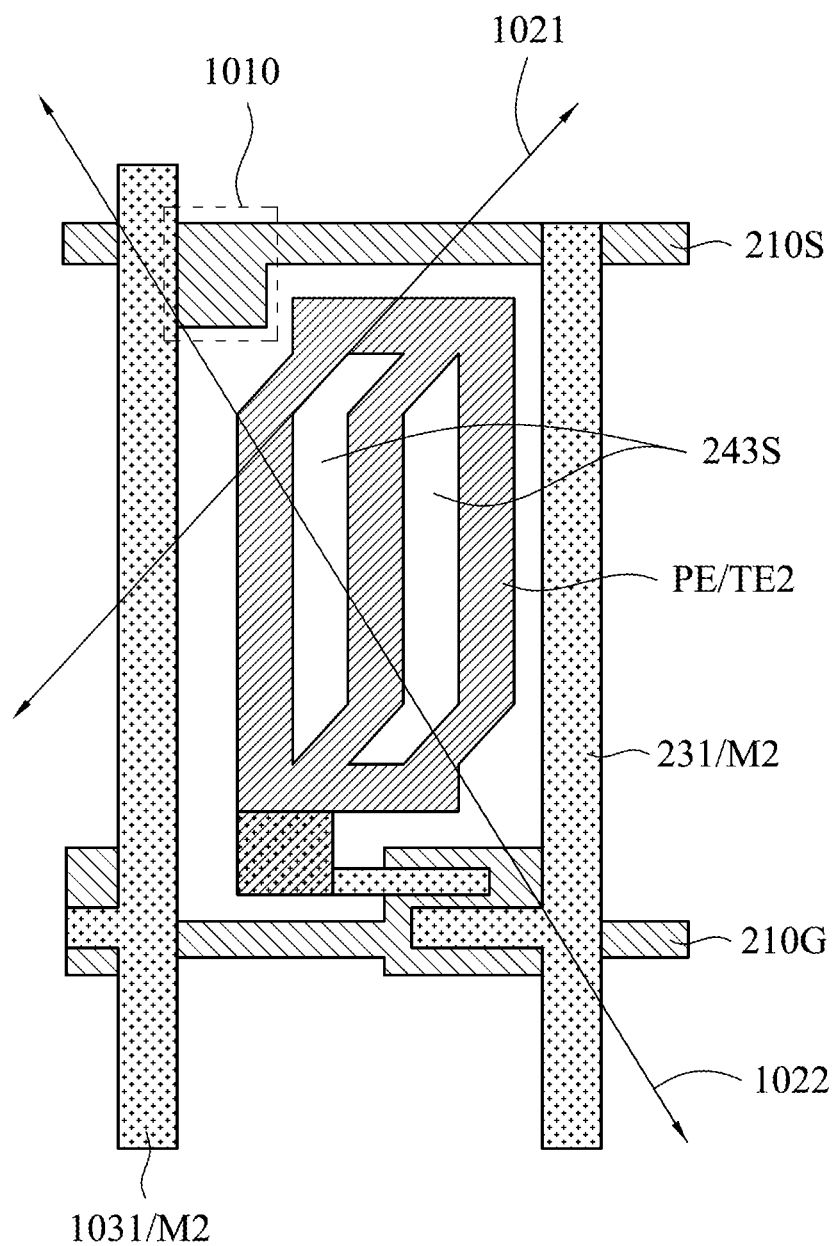
FIG. 9 is a schematic top view of the pixel structure in accordance with another embodiment.

FIG. 9 is a schematic top view of the pixel structure in accordance with another embodiment. In the embodiment of FIG. 9, the touch sensing line 210S is disposed at the top of the pixel structure, and that is to say, the pixel electrode PE is disposed between the touch sensing line 210S and the scan line 210G. A connection structure 1010 is disposed at the top left corner of the pixel structure. In this embodiment, the pixel electrode PE has the slits 243S extending along a vertical direction and a direction 1021. An alignment film of the display panel has a direction 1022, and an angle formed between the direction 1021 and the direction 1022 is in a range from 30 degrees to 80 degrees. The pixel electrode PE extends from the bottom left corner to the top right corner, and therefore there is space at the top left corner of the pixel structure. When the connection structure 1010 is disposed at the top left corner of the pixel structure, the voltage of the pixel electrode PE would not be affected relatively.

FIG. 10A to FIG. 10G are cross-sectional views of intermedia steps for manufacturing the pixel structure in accordance with another embodiment. Six patterning processed are performed in the embodiments of FIG. 2B to FIG. 7B, but seven patterning processes are performed in the embodiments of FIG. 10A to FIG. 10G. The difference may not be told from the top view, and therefore only cross-sectional views are shown below.

Figure 2B:
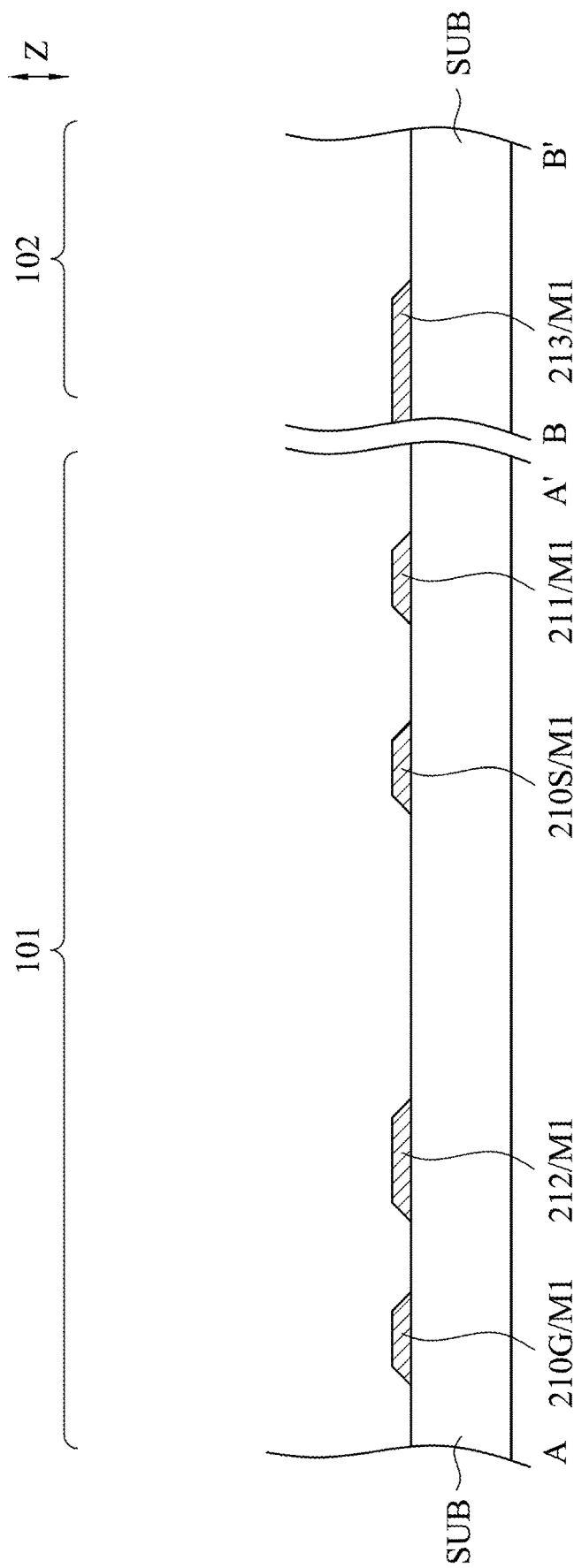
FIG. 2B, FIG. 3B, FIG. 4B, FIG. 5B, FIG. 6B, and FIG. 7B are cross-sectional views of intermedia steps for manufacturing the pixel structure in accordance with an embodiment.
Figure 10A:
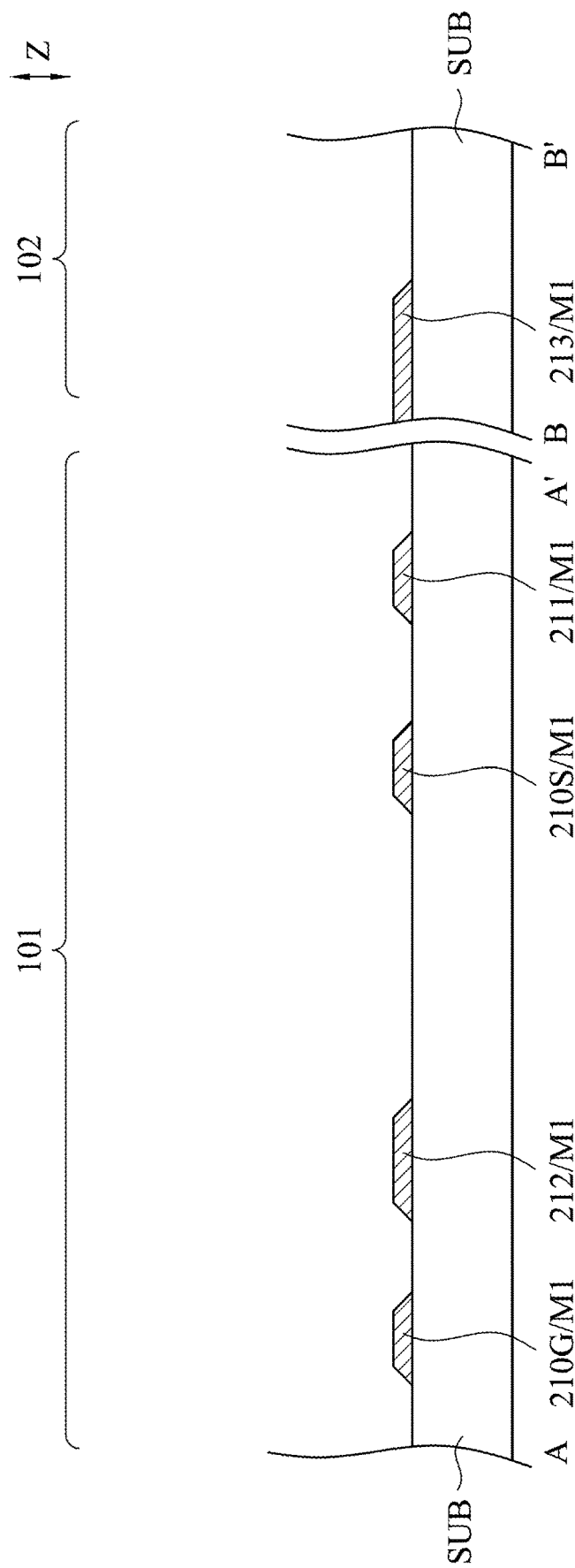
FIG. 10A to FIG. 10G are cross-sectional views of intermedia steps for manufacturing the pixel structure in accordance with another embodiment.
Figure 10B:
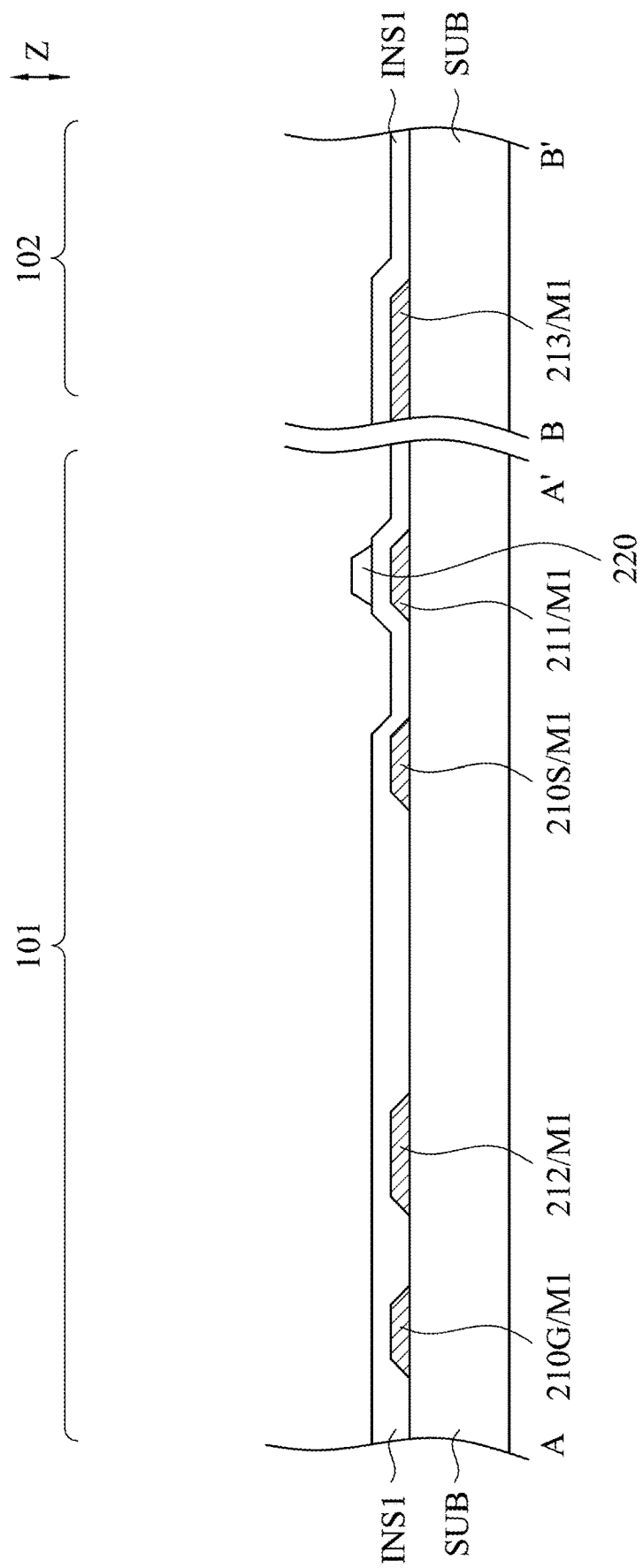

FIG. 10A is identical to FIG. 2B in which the substrate SUB is provided, and a first patterning process is performed to form the patterned first metal layer M1 (i.e. first conducting layer). FIG. 10B is identical to FIG. 3B in which a second patterning process is performed to form the insulation layer INS1 and the semiconductor layer 220.

Figure 10C:
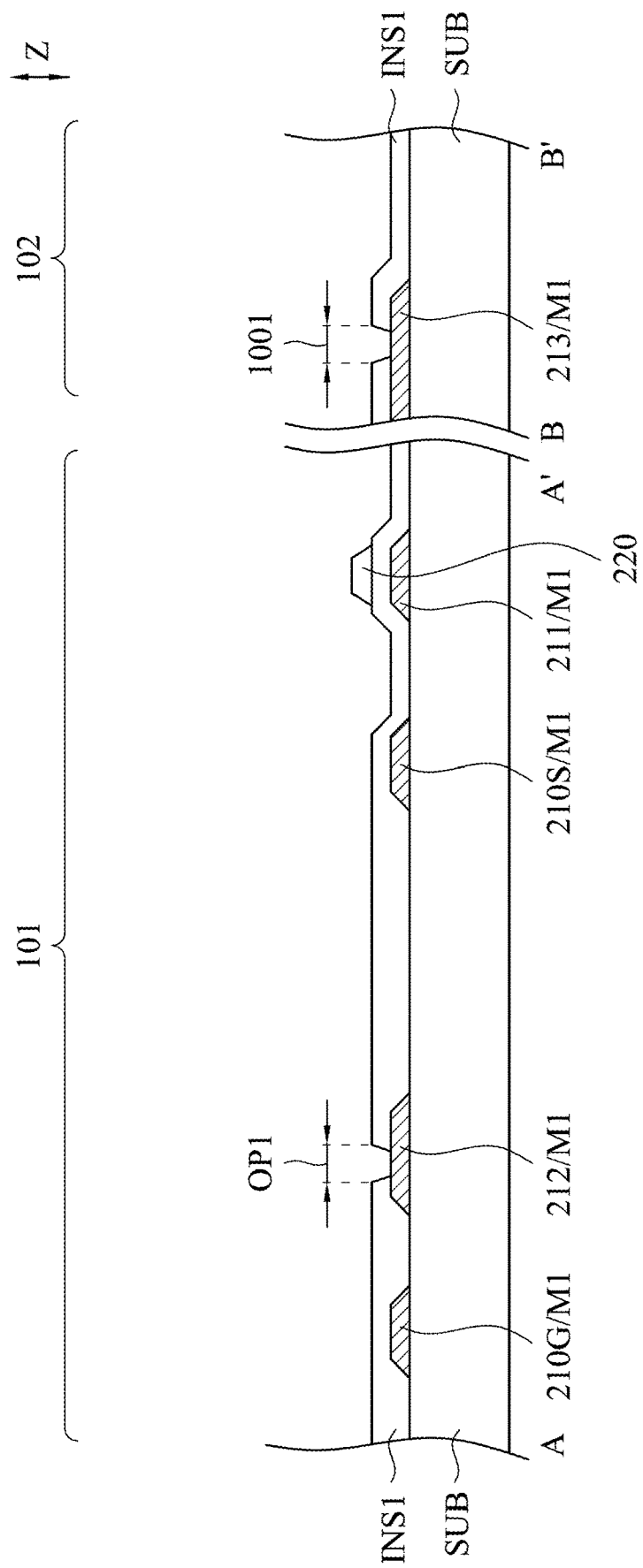

In FIG. 10C, a third patterning process is performed to form openings OP1 and 1001 (also referred to first openings) in the insulation layer INS1. The opening OP1 exposes a portion of the extending pad 212, and the opening 1001 exposes the conductive line 213.

Figure 10D:
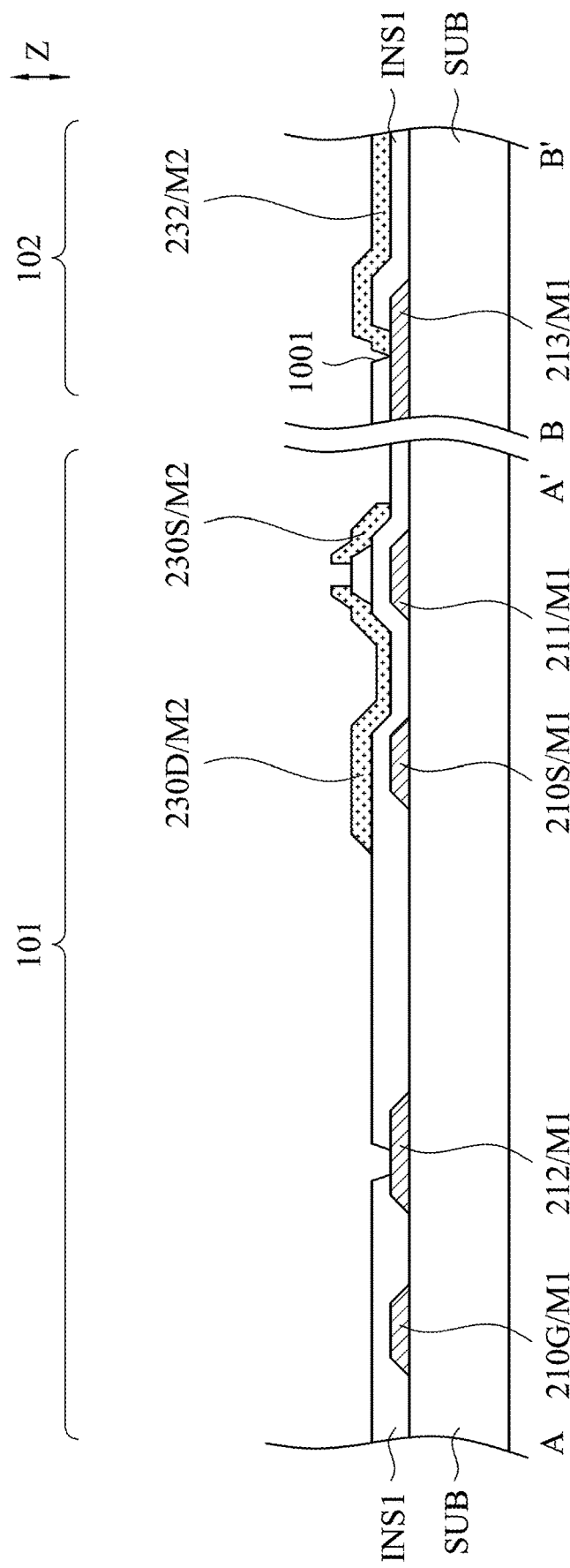

FIG. 10D is similar to FIG. 4B in which a fourth patterning process is performed to form the patterned second metal layer M2 (i.e. second conducting layer). The difference is that in FIG. 10D, the conductive line 232 is connected to the conductive line 213 through the opening 1001. In other words, the metal layer M2 (i.e. second conducting layer) is directly connected to the metal layer M1 (i.e. first conducting layer) through the opening 1101 in the non-display area 102.

Figure 10E:
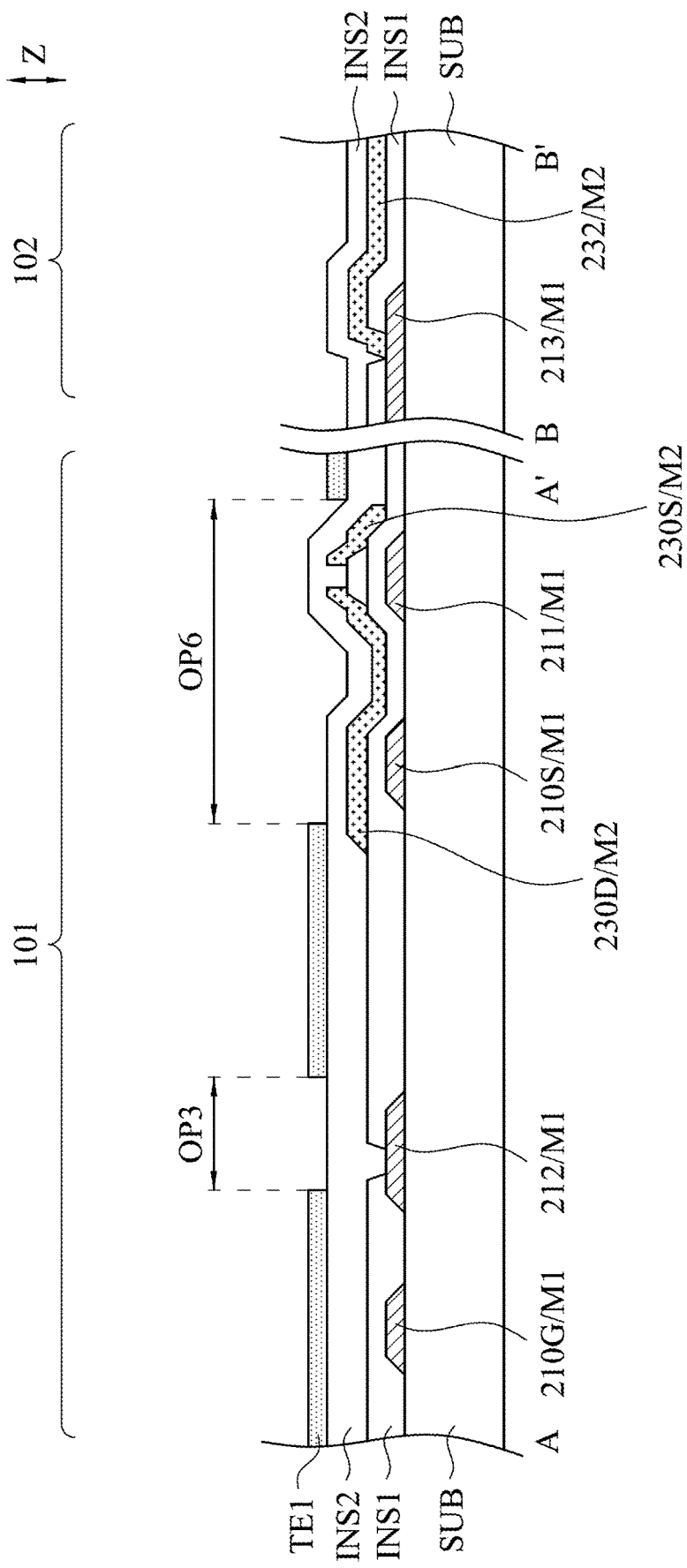

FIG. 10E is similar to FIG. 5B in which a fifth patterning process is performed to form the insulation layer INS2 and the patterned transparent conducting layer TE1. The transparent conducting layer TE1 includes the touch electrodes/common electrodes.

Figure 10F:
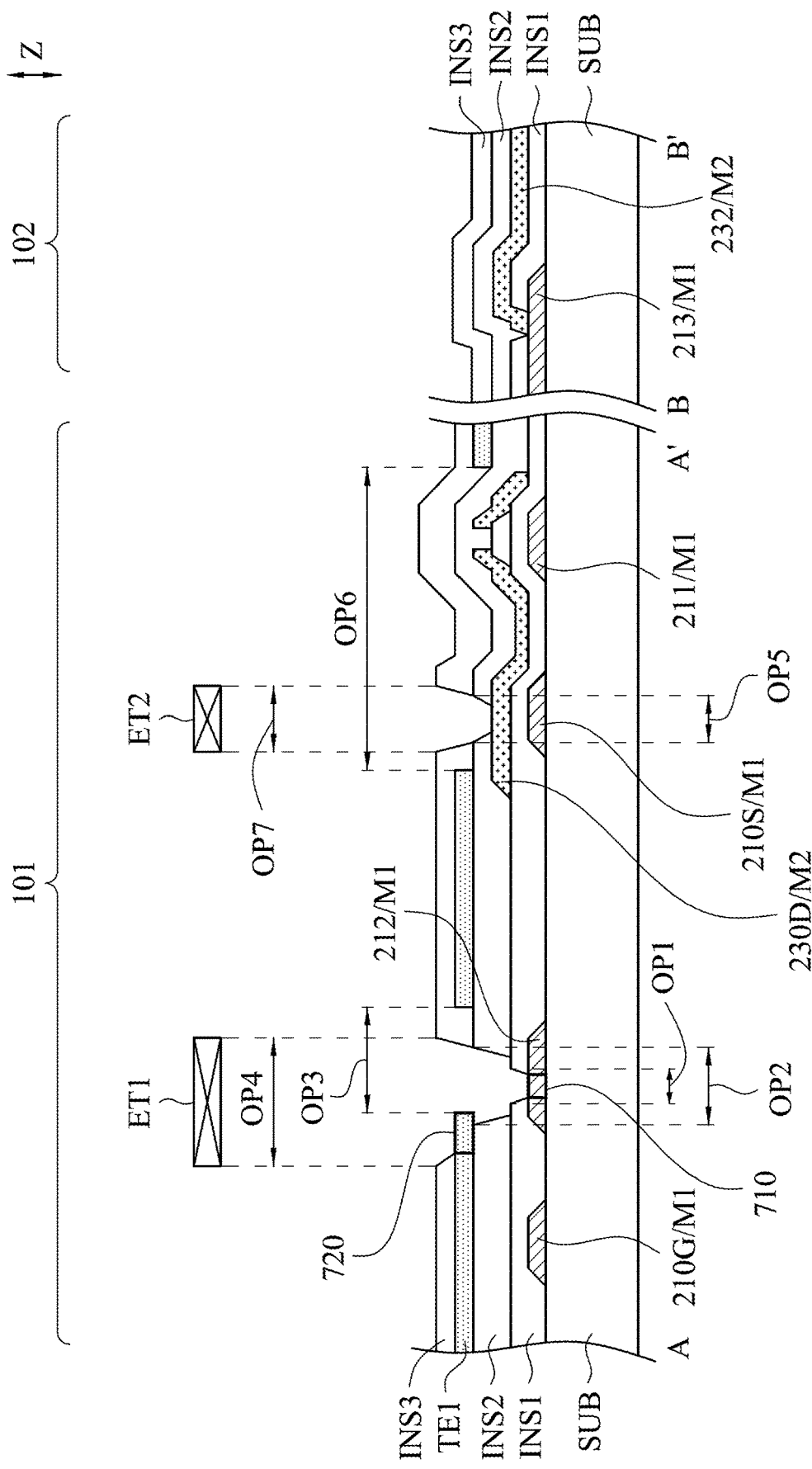

FIG. 10F is similar to FIG. 6B in which the insulation layer INS3 is formed, and then a sixth patterning process is performed in the etching areas ET1 and ET2. The difference is that the time of the lithography process of FIG. 10F is decreased because the opening OP1 has been formed, and thus it would not generate an opening with excessive diameter, or even the phenomenon of under cutting may be avoided at the insulation layer INS2 below the conducting layer TE1.

Figure 10G:
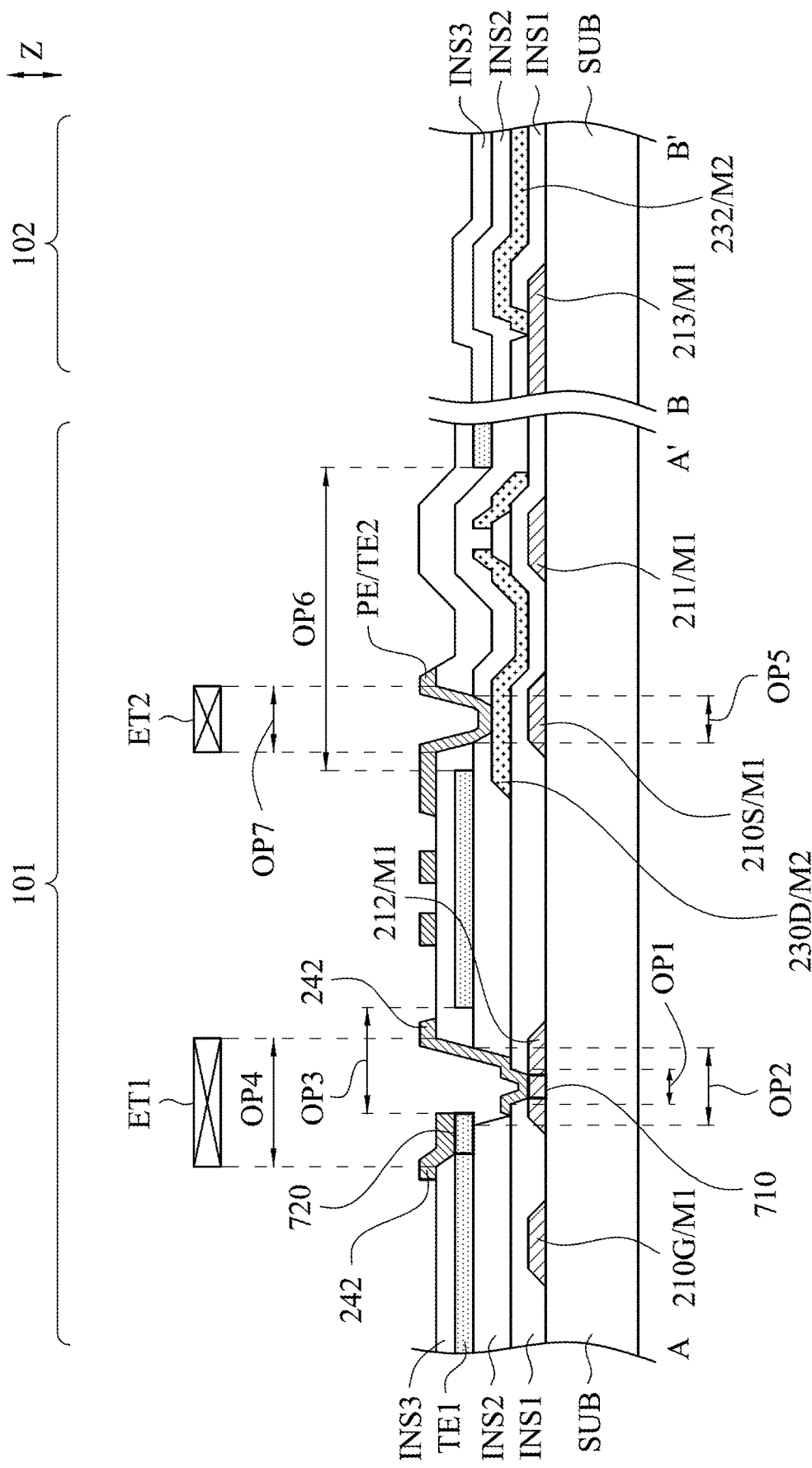

FIG. 10G is similar to FIG. 7B in which a seventh patterning process is performed to form a patterned transparent conducting layer TE2. The transparent conducting layer TE2 includes the connection electrode 242 and the pixel electrode PE.

This design can achieve slim border of the non-display area 102. The manufacturing cost is reduced and the yield rate is increased at the same time. It contributes to the design and promotion of the product significantly.

Figure 11A:
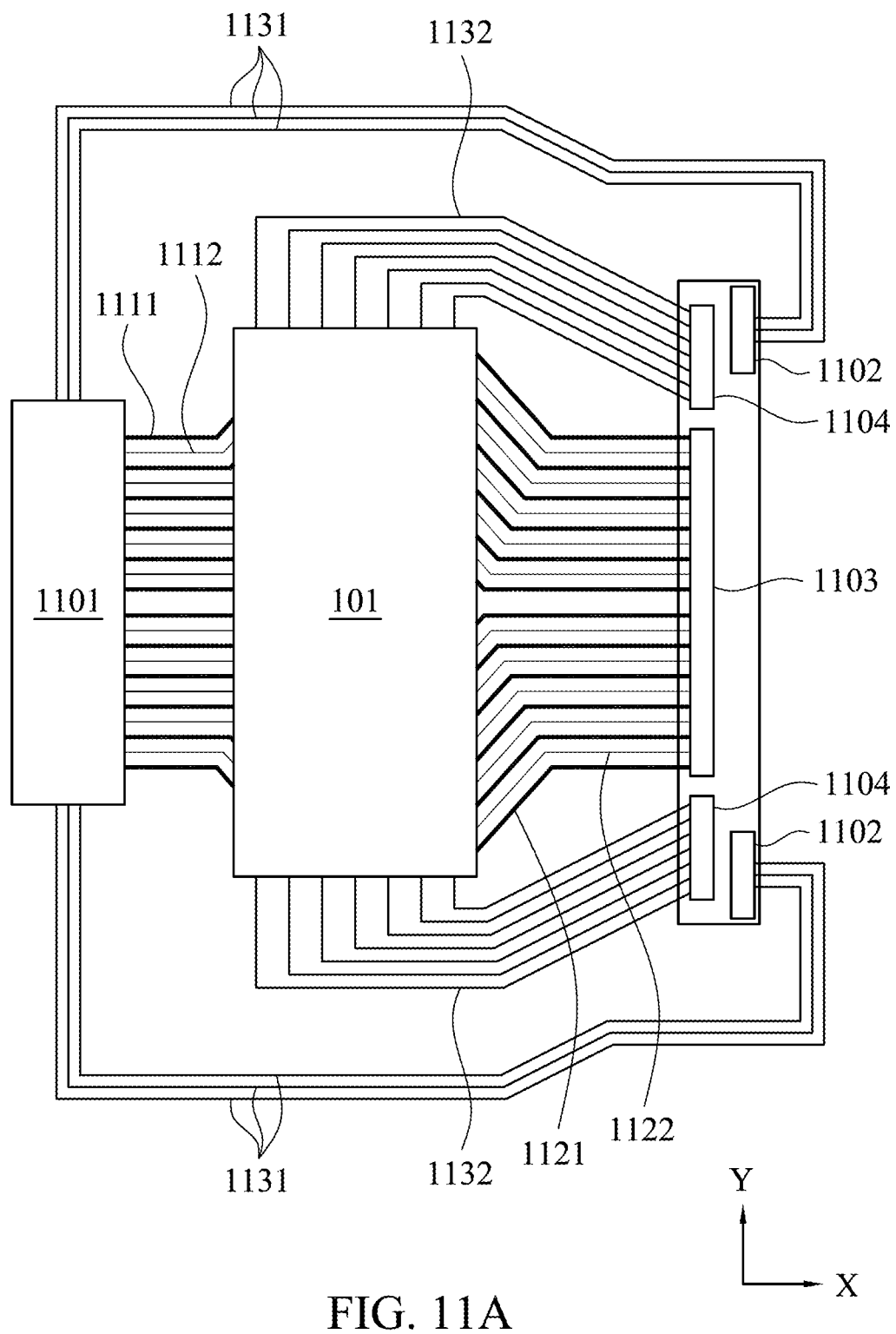
FIG. 11A is a schematic top view of the display panel in the landscape mode in accordance with an embodiment.

FIG. 11A is a schematic top view of the display panel in the landscape mode in accordance with an embodiment. Referring to FIG. 11A, the trace configuration of the non-display area 102 is described herein. In general, the panel has two usage orientations which are landscape and portrait orientations. The landscape orientation is shown in FIG. 11A, and it may be applied to electrical devices such as laptop, TV, tablet, etc. The length of the display area 101 along the Y direction is longer than that along the X direction In FIG. 11A. However, FIG. 11A is merely shown for illustration, and the length of the display area 101 along the Y direction may be shorter than that along the X direction in other embodiments. In addition, a technical solution of Integrated Gate Driver (IGD) is adopted in the embodiment of FIG. 11A, and therefore an IGD circuit 1101 is disposed in the non-display area. Although only one IGD circuit 1101 is shown in FIG. 11A, multiple IGD circuits may be disposed on the panel in other embodiments. The scan lines in the display area 101 are formed by the same metal layer (e.g. first metal layer), but part of the scan lines are transferred to another metal layer through the connection structures in the non-display area. For example, two adjacent scan lines 1111 and 1112 are formed by the first metal layer and the second metal layer respectively in the non-display area. The scan lines are connected to the IGD circuit 1101 in the non-display area, and the IGD circuit 1101 are electrically connected to gate pads (not shown) in a gate pad zone 1102 through multiple conductive lines 1131. Similarly, the touch sensing lines are formed by the same metal layer (e.g. first metal layer) in the display area 101, but part of the touch sensing lines are transferred to another metal layer through connection structures in the non-display area. For example, two adjacent touch sensing lines 1121 and 1122 are formed by the first metal layer and the second metal layer respectively in the non-display area. These touch sensing lines are connected to touch sensing pads (not shown) in a touch sensing pads zone 1103. In addition, multiple source pads (not shown) in the source pads zones 1104 are disposed at the top side and the bottom side of the touch sensing pads zone 1103 for electrically connecting to the data lines 1132. The source pads in the source pads zone 1104 and the touch sensing pads in the touch sensing pads zone 1103 are arranged along the Y direction in which the touch sensing pads are disposed between the source pads. In particular, the IGD circuit 1101 is disposed at a side of the display area 101, and the touch sensing pads zone 1103 is disposed at another side of the display area 101. As a result, the conductive lines 1131 would not overlap or intersect with the touch sensing lines or data lines 1132 when viewed from the direction perpendicular to the substrate. In this embodiment, the aforementioned gate pads, touch sensing pads, and the source pads are not shown one by one, and only the zones where they are shown for clarity.

Figure 11B:
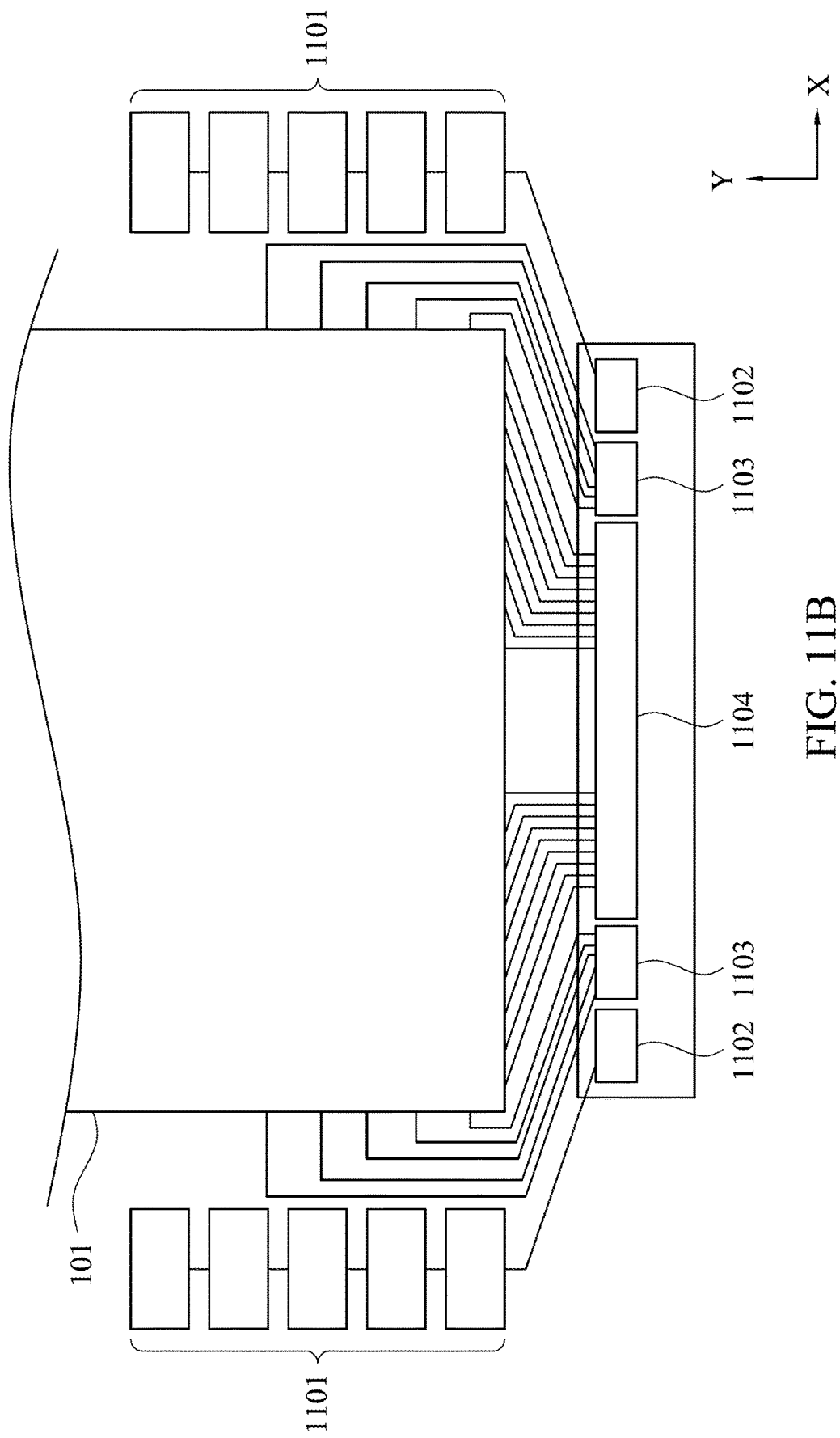
FIG. 11B is a schematic top view of the display panel in the portrait mode in accordance with an embodiment.

FIG. 11B is a schematic top view of the display panel in the portrait mode in accordance with an embodiment. The portrait mode is adopted in the embodiment of FIG. 11B, and it may be applied to electrical devices such as smart phone. In the embodiment of FIG. 11B, the IGD circuits 1101 are disposed at the left side and the right side of the display area 101. The IGD circuits 1101 are electrically connected to the gate pads (not shown) in the gate pad zone 1102 at the bottom of the display area 101, and are electrically connected to the scan lines which are not shown in FIG. 11B for simplification. In addition, the touch sensing lines in the display area 101 extend along the X direction, and they extend downward in the non-display area 102 for electrically connecting to touch sensing pads (not shown) in the touch sensing pads zone 1103. The data lines extend along the Y direction in the display area 101, and are electrically connected to source pads (not shown) in the source pads zone 1104 in the non-display area 102. From another aspect, in the embodiment of FIG. 11B, the gate pads, the touch sensing pads and the source pads are arranged along the X direction, and the source pads are disposed between the touch sensing pads and between the gate pads. Similarly, in this embodiment, the aforementioned gate pads, touch sensing pads, and the source pads are not shown one by one, and only the zones where they are shown for clarity.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display panel having a display area and a non-display area, wherein the display device comprises:
 a substrate;
 a pixel structure in the display area, wherein the pixel structure comprises:
  a first conducting layer disposed on the substrate and having a scan line and a touch sensing line;
  a first insulation layer disposed on the first conducting layer, wherein the first insulation layer has a first opening exposing at least a portion of the touch sensing line as a first connection part;
  a second conducting layer disposed on the first insulation layer, wherein the second conducting layer comprises a data line;
  a second insulation layer disposed on the second conducting layer and the first insulation layer, wherein the second insulation layer has a second opening corresponding to the first opening;
  a first electrode disposed on the second insulation layer, wherein the first electrode has a third opening which is at least partially overlapped with the second opening;
  a third insulation layer disposed on the first electrode, wherein the third insulation layer has a fourth opening exposing at least a portion of the first electrode as a second connection part, and the fourth opening is at least partially overlapped with the third opening; and
  a second electrode on the third insulation layer, wherein the second electrode is connected to the first connection part and the second connection part through the fourth opening, the third opening, the second opening, and the first opening.

2. The display panel of claim 1, wherein a ratio of an area of the second connection part exposed by the fourth opening to an area of the fourth opening is in a range from 0.1 to 1.

3. The display panel of claim 1, wherein an area of the second electrode contacting the first connection part is defined as a first contacting area, and an area of the second electrode contacting the second connection part is defined as a second contacting area, and a ratio of the first contacting area to the second contacting area is in a range from 0.1 to 10.

4. The display panel of claim 1, further comprising:
 a gate formed by the first conducting layer;
 a source and a drain formed by the second conducting layer;
 a semiconductor layer insulated from the gate; and
 a pixel electrode disposed on the third insulation layer, wherein the pixel electrode has a slit pattern, and the pixel electrode and the second electrode are formed by a same process,
 wherein the second insulation layer further has a fifth opening exposing a portion of the drain, and the first electrode has a sixth opening overlapped with the fifth opening, and the third insulation layer has a seventh opening overlapped with the fifth opening, wherein the pixel electrode is connected to the drain through the fifth opening, the sixth opening, and the seventh opening.

5. The display panel of claim 4, wherein the touch sensing line is at least partially overlapped with the drain and the pixel electrode.

6. The display panel of claim 5, wherein the touch sensing line comprises an extending pad which is overlapped with the fourth opening along a direction perpendicular to the substrate.

7. The display panel of claim 6, wherein the extending pad extends along a direction from the touch sensing line to the scan line.

8. The display panel of claim 1, wherein an area of the second electrode is larger than an area of the fourth opening, and the second electrode comprises:
a first portion connected to the first electrode through the fourth opening;
a second portion overlapped with the fourth opening and the third opening, wherein the second portion is connected to the touch sensing line but not connected to the first portion; and
a third portion that is not overlapped with the fourth opening, wherein the third portion is formed on the third insulation layer and connected to the first portion and the second portion.

9. The display panel of claim 1, wherein the scan line and the touch sensing line extend along a first direction, and the data line extends along a second direction, and the first direction is substantially perpendicular to the second direction.

10. The display panel of claim 9, further comprising:
a plurality of gate pads;
an integrated gate driver disposed at a side of the display area for electrically connecting to the scan line and electrically connecting to the gate pads;
a plurality of touch sensing pads arranged along the second direction and disposed at another side of the display area for electrically connecting to the sensing line; and
a plurality of source pads arranged along the second direction in the non-display area,
wherein the touch sensing pads are disposed between the source pads.

11. The display panel of claim 9, further comprising:
a plurality of gate pads arranged along the first direction in the non-display area;
a plurality of touch sensing pads arranged along the first direction in the non-display area; and
a plurality of source pads arranged along the first direction in the non-display area,
wherein the source pads are disposed between the touch sensing pads and between the gate pads.

12. A method for manufacturing a display panel, wherein the method comprises:
providing a substrate;
forming a patterned first conducting layer on the substrate, wherein the patterned first conducting layer comprises a scan line, a touch sensing line, and a gate;
forming a first insulation layer on the patterned the first conducting layer;
forming a patterned semiconductor layer on the first insulation layer;
forming a patterned second conducting layer on the first insulation layer, wherein the patterned second conducting layer comprises a drain, a source, and a data line that is connected to the source;
forming a second insulation layer on the patterned second conducting layer and the first insulation layer;
forming a patterned first electrode on the second insulation layer, wherein the patterned first electrode comprises a third opening which is partially overlapped with the touch sensing line;
forming a third insulation layer on the patterned first transparent electrode;
performing an etching process to form a fourth opening in the third insulation layer, a second opening in the second insulation layer, and a first opening in the first insulation layer, wherein the first opening exposes a portion of the touch sensing line as a first connection part, and the fourth opening is at least partially overlapped with the third opening, and the fourth opening exposes a portion of the first electrode as a second connection part; and
forming a patterned second electrode on the third insulation layer, wherein the patterned second electrode comprises a connection electrode for electrically connecting the first connection part with the second connection part.

13. The method of claim 12, wherein a ratio of an area of the second connection part exposed by the fourth opening to an area of the fourth opening is in a range from 0.1 to 1.

14. The method of claim 12, wherein an area of the second electrode contacting the first connection part is defined as a first contacting area, and an area of the second electrode contacting the second connection part is defined as a second contacting area, and a ratio of the first contacting area to the second contacting area is in a range from 0.1 to 10.

15. The method of claim 12, wherein the touch sensing line is at least partially overlapped with the drain and the pixel electrode.

16. The method of claim 15, wherein the touch sensing line comprises an extending pad which is overlapped with the fourth opening along a direction perpendicular to the substrate.

17. The method of claim 16, wherein the extending pad extends along a direction from the touch sensing line to the scan line.

18. The method of claim 12, wherein an area of the second electrode is larger than an area of the fourth opening, and the second electrode comprises:
a first portion connected to the first electrode through the fourth opening;
a second portion overlapped with the fourth opening and the third opening, wherein the second portion is connected to the touch sensing line but not connected to the first portion; and
a third portion that is not overlapped with the fourth opening, wherein the third portion is formed on the third insulation layer and connected to the first portion and the second portion.

19. A method for manufacturing a display panel, wherein the method comprises:
providing a substrate;
performing a first patterning process to form a patterned first conducting layer on the substrate, wherein the patterned first conducting layer comprises a scan line, a touch sensing line and a gate;
forming a first insulation layer on the patterned first conducting layer;
performing a second patterning process to form a patterned semiconductor layer on the first insulation layer;
performing a third patterning process to form a plurality of first openings in the first insulation layer, wherein one of the first openings exposes a portion of the touch sensing line as a first connection part;

performing a fourth patterning process to form a patterned second conducting layer on the first insulation layer, wherein the patterned second conducting layer comprises a drain, a source and a data line, and the data line is connected to the source, wherein the patterned second conducting layer is connected to the patterned first conducting layer through one of the first openings in the non-display area;

forming a second insulation layer on the patterned second conducting layer and the first insulation layer;

performing a fifth patterning process to form a patterned first electrode on the second insulation layer, wherein the patterned first electrode comprises a third opening which is partially overlapped with the touch sensing line;

forming a third insulation layer on the patterned first electrode;

performing a sixth patterning process to form a fourth opening in the third insulation layer and a second opening in the second insulation layer, wherein the fourth opening is at least partially overlapped with the third opening, and the fourth opening exposes a portion of the first electrode as a second connection part; and performing a seventh patterning process to form a patterned second electrode on the third insulation layer, wherein the patterned second electrode comprises a connection electrode for electrically connecting the first connection part with the second connection part.

* * * * *